US012697582B2

(12) United States Patent
Scherpbier et al.

(10) Patent No.: US 12,697,582 B2
(45) Date of Patent: Aug. 4, 2026

(54) HYBRID CARBON DIOXIDE REMOVAL SYSTEMS

(71) Applicant: AirMyne, Inc., Berkeley, CA (US)

(72) Inventors: Bart Ludo Scherpbier, San Francisco, CA (US); Jun Seon Hong, Berkeley, CA (US); Derek Chase Popple, Sacramento, CA (US); Mark Patrick Cyffka, El Cerrito, CA (US); Aryaman Bhartia, Berkeley, CA (US); Cyndia Aiyun Cao, Oakland, CA (US); Arun Suresh Kamath, Berkeley, CA (US); Sudip Mukhopadhyay, Berkeley, CA (US)

(73) Assignee: AirMyne, Inc., Berkeley, CA (US)

( * ) Notice: Subject to any disclaimer, the term of this patent is extended or adjusted under 35 U.S.C. 154(b) by 130 days.

(21) Appl. No.: 18/650,579

(22) Filed: Apr. 30, 2024

(65) Prior Publication Data

US 2025/0153096 A1 May 15, 2025

Related U.S. Application Data

(63) Continuation of application No. 18/509,878, filed on Nov. 15, 2023, now Pat. No. 12,005,390.

(51) Int. Cl.
*B01D 53/14* (2006.01)
*B01D 53/18* (2006.01)
(Continued)

(52) U.S. Cl.
CPC ..... *B01D 53/1493* (2013.01); *B01D 53/1406* (2013.01); *B01D 53/1412* (2013.01);
(Continued)

(58) Field of Classification Search
CPC ............ B01D 53/1406; B01D 53/1412; B01D 536/1425; B01D 53/1475; B01D 53/1493;
(Continued)

(56) References Cited

U.S. PATENT DOCUMENTS 11,612,853 B1 3/2023 Mukhopadhyay et al.
11,644,220 B1 5/2023 Marsh
(Continued)

FOREIGN PATENT DOCUMENTS

WO WO-2012021728 A2 * 2/2012 ......... B01D 19/0036

OTHER PUBLICATIONS

"Ohio research proposes coupling geothermal with direct aircarbon capture", ThinkGeoEnergy—Geothermal Energy News, Ohio research proposes coupling geothermal with direct air carbon capture (thinkgeoenergy.com), Feb. 2024, 5 pages.
(Continued)

*Primary Examiner* — Jennifer Dieterle
*Assistant Examiner* — Phillip Y Shao
(74) *Attorney, Agent, or Firm* — Henry Patent Law Firm PLLC

(57) ABSTRACT

In a general aspect, a carbon dioxide removal system is presented. In some cases, a gas-liquid contactor is wetted with an alkaline capture solution. A first flow from a first gaseous feed including $CO_2$ from a first source is directed to interact with the alkaline capture solution in the gas-liquid contactor, which forms a first $CO_2$-rich alkaline capture solution. A second flow from a second gaseous feed including $CO_2$ from a second, distinct source is directed to interact with the first $CO_2$-rich alkaline capture solution, which forms a second $CO_2$-rich alkaline capture solution. In some cases, the second flow is independent of the first gaseous feed, and a concentration of $CO_2$ in the second $CO_2$-rich alkaline capture solution is higher than a concentration of
(Continued)

CO$_2$ in the first CO$_2$-rich alkaline capture solution. CO$_2$ can be separated from the second CO$_2$-rich alkaline capture solution.

18 Claims, 10 Drawing Sheets

(51) Int. Cl.
   *B01D 53/62*        (2006.01)
   *B01D 53/78*        (2006.01)
(52) U.S. Cl.
   CPC ..... *B01D 53/1425* (2013.01); *B01D 53/1475* (2013.01); *B01D 53/185* (2013.01); *B01D 53/62* (2013.01); *B01D 53/78* (2013.01); *B01D 2251/60* (2013.01); *B01D 2251/80* (2013.01); *B01D 2252/204* (2013.01); *B01D 2252/20494* (2013.01); *B01D 2252/504* (2013.01); *B01D 2252/602* (2013.01); *B01D 2257/504* (2013.01); *B01D 2258/0283* (2013.01)
(58) Field of Classification Search
   CPC ...... B01D 53/185; B01D 53/62; B01D 53/78; B01D 2251/60; B01D 2251/80; B01D 2252/204; B01D 2252/20494; B01D 2252/504; B01D 2252/602; B01D 2257/504; B01D 2258/0283; Y02C 20/40
   See application file for complete search history.

(56)                References Cited

U.S. PATENT DOCUMENTS

| | | | |
|---|---|---|---|
| 11,801,476 B2 | 10/2023 | Scherpbier et al. | |
| 11,927,177 B2 | 3/2024 | Marsh et al. | |
| 2007/0286783 A1* | 12/2007 | Carrette | B01D 53/1425<br>423/220 |
| 2010/0216686 A1* | 8/2010 | Kobayashi | B01D 53/78<br>510/475 |
| 2012/0009114 A1* | 1/2012 | Chen | B01D 53/1425<br>423/437.1 |
| 2012/0303172 A1* | 11/2012 | Lee | H04L 43/0817<br>700/295 |
| 2012/0305840 A1* | 12/2012 | Murai | B01D 53/1475<br>252/184 |
| 2014/0369913 A1 | 12/2014 | Nakamura et al. | |
| 2015/0005564 A1 | 1/2015 | Tanna | |
| 2015/0251129 A1 | 9/2015 | Heirman et al. | |
| 2016/0001223 A1 | 1/2016 | Okuno et al. | |
| 2016/0030880 A1* | 2/2016 | Wong | B01D 53/1425<br>95/178 |
| 2016/0200592 A1 | 7/2016 | Barnes et al. | |
| 2016/0361682 A1 | 12/2016 | Yukumoto et al. | |
| 2018/0001254 A1 | 1/2018 | Fujita et al. | |
| 2023/0102252 A1 | 3/2023 | Jewett et al. | |
| 2023/0213247 A1 | 7/2023 | Legg et al. | |

OTHER PUBLICATIONS

Blackwell, David D, et al., "Geothermal resources in Sedimentary Basins", Geothermal Energy Generation in Oil and Gas Settings, Mar. 13, 2006, 28 pages.

Khodayar, Maryam , et al., "Conventional Geothermal Systems and Unconventional Geothermal Developments: An Overview", vol. 14, No. 2, 196-246, Feb. 20, 2024, 51 pages.

Leveni, Martina , et al., "A potential for climate benign direct air CO2 capture with CO2-driven geothermal utilization and storage (DACCUS)", Environmental Research Letters, 19 014007, Nov. 30, 2023, 11 pages.

Mccarthy, Kevin , et al., "Geothermal Play Fairway Analysis (GPFA): A Texas/Gulf Coast Case Study", Proceedings, 49th Workshop on Geothermal Reservoir Engineering Stanford University, Feb. 12-14, 2024, 18 pages.

Ogland-Hand, Jonathan D, et al., "Meeting Net-Zero America Direct Air Capture Targets with Sedimentary Basin Geothermal Heat While Considering Environmental Justice", Proceedings, 49th Workshop on Geothermal Reservoir Engineering, Stanford University, Stanford, California, Feb. 12-14, 2024, SGP-TR-227, Feb. 12-14, 2024, 9 pages.

USPTO, Notice of Allowance issued in U.S. Appl. No. 18/509,878 on Feb. 6, 2024, 21 pages.

"DAC-DC hybrid system", Sustainable Green Energy Innovations, https://sgeglobal.net/sge-novel-carbon-capture-technologies/, Sep. 20, 2023, 7 pages.

"Hybrid DAC offers a transformational way to achieve net zero carbon", AVNOS, https://www.avnos.com/technology/, Sep. 20, 2023, 5 pages.

Asif, Muhammad , et al., "Post-combustion CO2 capture with chemical absorption and hybrid system: current status and challenges", Greenhouse Gas Sci Technol, 8: 998-1031, 2018, 34 pages.

Karaszova, Magda, et al., "Post-combustion carbon capture by membrane separation, Review", Separation and Purification Technology 238 (2020) 116448, Dec. 17, 2019, 8 pages.

Keith, David W, et al., "A process for Capturing CO2 from the atmosphere", Joule, 2, 1573-1594, Aug. 15, 2018, Aug. 15, 2018, 27 pages.

Madden, David G, et al., "Flue-gas and direct-air capture of CO2 by porous metal-organic materials", Phil. Trans. R. Soc. A.3752016002520160025, 2017, 11 pages.

Mcgrail, Bernard P, "A combined water and CO2 direct air capture system", technical report PNNL-SA-161144, Feb. 1, 2021, 5 pages.

Ozkan, Mihrimah , et al., "The Status and Prospects of Materials for Carbon Capture Technologies", MRS Bulletin vol. 47, Apr. 2022, 390-394, 5 pages.

Ramasubramanian, Kartik , et al., "Membrane processes for carbon capture from coal-fired power plant flue gas: a modeling and cost study", Journal of Membrane Science, 421-422, 299-310, Aug. 1, 2012, Aug. 1, 2012, 12 pages.

Rim, Guanhe , et al., "Solvent Impregnated Polymers Loaded with Liquid-Like Nanoparticle Organic Hybrid Materials for Enhanced Kinetics of Direct Air Capture and Point Source CO2 Capture", Adv. Funct. Mater. 2021, 31, 2010047. 1-13, Mar. 18, 2021, 14 Pages.

Sagues, William J, et al., "Enhanced carbon dioxide removal from coupled direct air capture-bioenergy systems", sustainable energy and fuels, 3, 3135, 2019, 12 pages.

Sifat, Najmus S, et al., "A critical review of CO2 capture technologies and Prospects for clean power generation", Energies 2019, 12(21), 4143; https://doi.org/10.3390/en12214143, Oct. 30, 2019, 33 pages.

* cited by examiner

500

| Experiment | Solution | Absorption T | % mol Absorption from Air | % mol Absorption from Flue | % CO₂ in Flue | % O₂ in flue | Desorption T | % Desorption CO₂ | % Purity of CO₂ Input | Total Energy Input | Total energy input w/ heat exchangers |
|---|---|---|---|---|---|---|---|---|---|---|---|
| 1 | solution 1 | 14 | 15 | 0 | 4 | 12 | 110 | 89 | 99 | 75 | 30 |
| 2 | solution 1 | 12 | 30 | 0 | - | | 110 | 95 | 99 | 40 | 12 |
| 3 | solution 1 | 14 | 45 | 0 | - | | 109 | 97 | 99 | 26 | 8 |
| 4 | solution 1 | 13 | 60 | 0 | - | | 112 | 95 | 99 | 20 | 4 |
| 5 | solution 1 | 12 | 20 | 80 | 4 | 12 | 120 | 96 | 97 | 5 | 2 |
| 6 | solution 1 | 14 | 30 | 70 | 12 | 14 | 110 | 97 | 96 | 4.5 | 2.2 |
| 7 | solution 1 | 18 | 20 | 75 | 2 | 12 | 112 | 95 | 99 | 5.5 | 2 |
| 8 | solution 1 | 19 | 42 | 55 | 4 | 12 | 114 | 99 | 97 | 4.5 | 1.8 |
| 9 | solution 1 | 14 | 25 | 73 | 12 | 16 | 109 | 97 | 98 | 4 | 1.7 |
| 10 | solution 1 | 14 | 0 | 100 | 4 | 12 | 120 | 99 | 98 | 5 | 1.6 |
| 11 | solution 1 | 10 | 0 | 89 | 4 | 14 | 111 | 95 | 98 | 4 | 1.4 |
| 12 | Solution 2 | 14 | 16 | 80 | 4 | 12 | 123 | 92 | 97 | 9 | 3.3 |
| 13 | Solution 3 | 15 | 17 | 78 | 4 | 12 | 109 | 94 | 99 | 7 | 2 |
| 14 | Solution 4 | 14 | 25 | 70 | 4 | 12 | 111 | 89 | 95 | 11 | 4.5 |
| 15 | Solution 5 | 12 | 18 | 72 | 4 | 12 | 125 | 90 | 92 | 12 | 5 |

Continue from FIG. 5A

| Experiment | Solution | Absorption T | % mol Absorption from Air | % mol Absorption from Flue | % CO2 in Flue | % O2 in flue | Desorption T | % Desorption | % Purity of CO2 | Total Energy Input | Total energy input w/ heat exchangers |
|---|---|---|---|---|---|---|---|---|---|---|---|
| 16 | solution 1 | 12 | 43 | | 0 | | 112 | 98 | 99 | 9 | 4.5 |
| 17 | solution 1 | 14 | 15 | | 80 | 12 | 120 | 99 | 99 | 4 | 1.7 |
| 18 | solution 1 | 30 | 37 | | 0 | | 116 | 99 | 99 | 8 | 3 |
| 19 | solution 1 | 45 | 46 | | 48 | 4 | 112 | 98 | 97 | 3.5 | 1.7 |
| 20 | solution 1 | 15 | 0 | | 99 | 4 | 116 | 97 | 96 | 6 | 1.5 |
| 21 | solution 1 | 14 | 15 | | 0 | 4 | 110 | 89 | 99 | 11 | 4 |
| 22 | solution 1 | 15 | 14 | | | 4 | 118 | 99 | 98 | 32 | 10 |
| 23 | solution 1 | 15 | 14 | | | 4 | 118 | 99 | 98 | 3 | 0.6 |
| 24 | solution 1 | 15 | 14 | | | 4 | 114 | 99 | 97 | 5 tons of steam per ton of $CO_2$ captured / 97 captured | 2 tons of steam per ton of $CO_2$ captured |
| 25 | solution 1 | 16 | 32 | | 100 | 2 | 116 | 100 | 98 | 1.1 ton of steam per ton of $CO_2$ captured | 0.4 captured |

FIG. 5B

| Cycle | % mol absorption | % mol desorption |
|---|---|---|
| Cycle 1 | 87 | 98 |
| Cycle 10 | 86 | 97 |
| Cycle 100 | 88 | 93 |
| Cycle 500 | 89 | 95 |
| Cycle 1000 | 88 | 93 |

600

HYBRID CARBON DIOXIDE REMOVAL SYSTEMS

CROSS-REFERENCE TO RELATED APPLICATIONS

This application is a continuation of U.S. patent application Ser. No. 18/509,878, filed Nov. 15, 2023, entitled "Hybrid Carbon Dioxide Removal Systems." The above-referenced priority document is incorporated herein by reference.

TECHNICAL FIELD

The following description relates to hybrid carbon dioxide removal systems for removing carbon dioxide gas, for example, from ambient air and flue gas.

BACKGROUND

Carbon dioxide removal technologies have been used to reduce carbon dioxide emissions in the Earth's atmosphere, with the goal of mitigating anthropogenic climate change caused by such emissions. For example, point source capture technologies have been used to reduce carbon dioxide emissions from flue gas from industrial facilities. As another example, direct air capture (DAC) technologies have been used to remove carbon dioxide from ambient air in the Earth's atmosphere.

BRIEF DESCRIPTION OF THE DRAWINGS

FIGS. 5A-5B include a table showing experiment conditions and associated total energy input using various hybrid carbon dioxide removal systems shown in FIGS. 1A-1C and 2A-2C.

DETAILED DESCRIPTION

In some aspects of what is described here, $CO_2$ gas from two distinct gaseous feeds, e.g., a first gaseous feed including ambient air and a second gaseous feed including a flue gas, can be captured and removed by operation of a hybrid carbon dioxide removal system. A first flow of the first gaseous feed can be directed into a gas-liquid contactor of the hybrid carbon dioxide removal system. In some aspects of operation, $CO_2$ gas from the first gaseous feed diffuses into the alkaline capture solution to form a first $CO_2$-rich alkaline capture solution. A second flow of the second gaseous feed is subsequently received; and directed to interact with the first $CO_2$-rich alkaline capture solution to form a second $CO_2$-rich alkaline capture solution. The dissolved $CO_2$ can be separated from the second $CO_2$-rich alkaline capture solution to regenerate the alkaline capture solution in a desorption column.

In some implementations, the systems and techniques described here can provide technical advantages and improvements. For example, the systems and techniques described here may reduce the energy usage for the carbon dioxide removal process by working in full capacity at large scale. The systems and techniques presented here may allow greater utilization of the capture capability of the alkaline capture solution to convert into a $CO_2$-complex in an upstream absorption reaction followed by a downstream desorption reaction to release high-purity $CO_2$. In some cases, the capture capability of the alkaline capture solution can be fully utilized. In some implementations, a hybrid carbon dioxide removal system may further include one or more heat exchangers which are configured to transfer heat from the flue gas or the regenerated alkaline capture solution from the desorption column to the second $CO_2$-rich alkaline capture solution to further reduced energy input for the overall carbon dioxide removal process. In some instances, waste heat from the point carbon sources such as power plants, refinery plants, or chemical factories may be further utilized for the same purposes. In some implementations, the alkaline capture solution used in the hybrid carbon dioxide removal systems presents lower risk (e.g., no fire hazard) and is benign to the presence of $O_2$ and moisture or humidity in the flue gas stream from pre- or post-combustion. The energy input for the overall process can be reduced, for example, to less than 1.5 MWh per ton $CO_2$ capture. In some cases, a combination of these and potentially other advantages and improvements may be obtained.

Figure 1A:
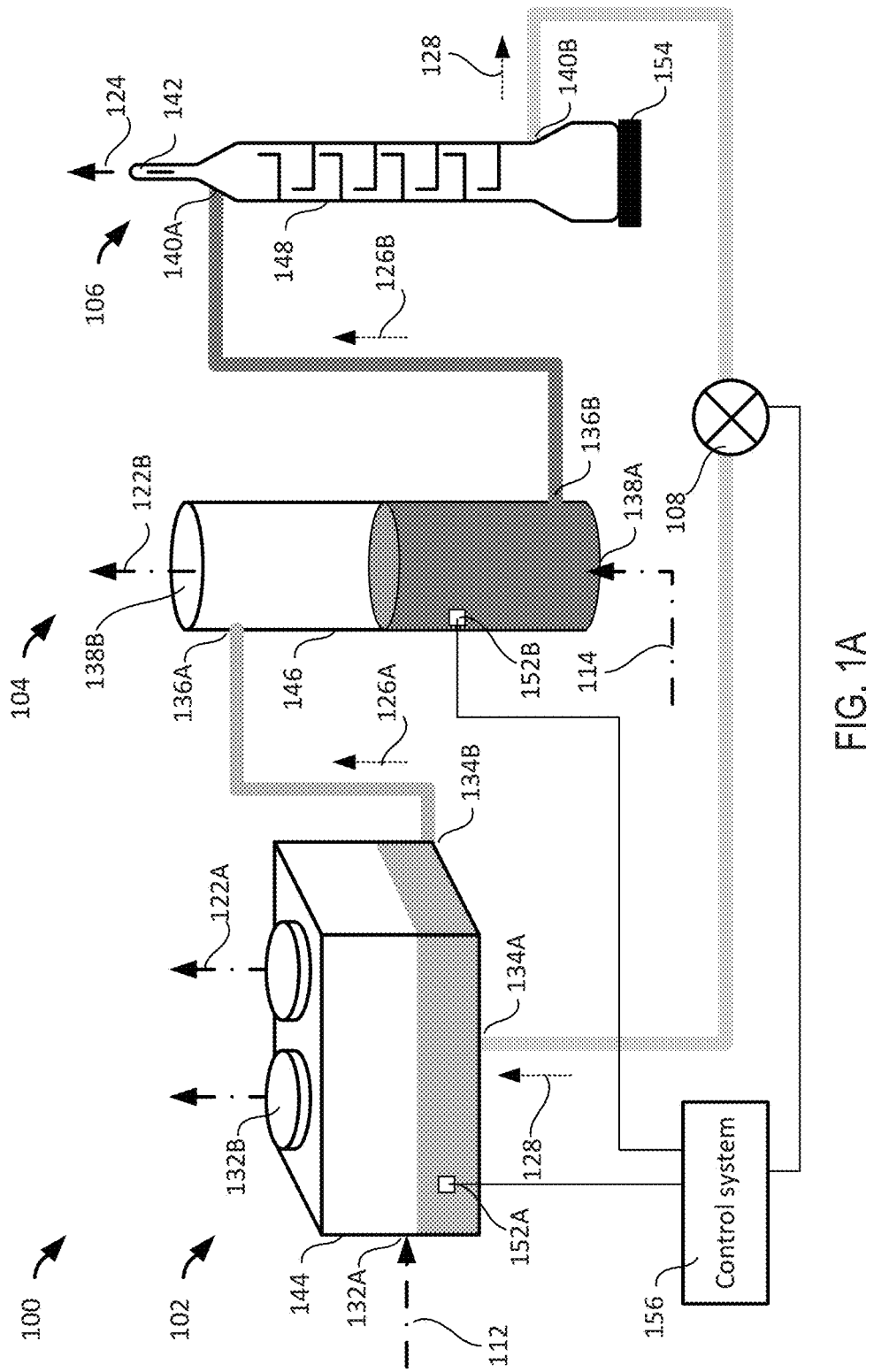
FIG. 1A is a schematic diagram showing aspects of an example hybrid carbon dioxide removal system.

FIG. 1A is a schematic diagram showing aspects of an example hybrid carbon dioxide removal system 100. In some implementations, the hybrid carbon dioxide removal system 100 is configured to perform a carbon dioxide ($CO_2$) capture and removal process by absorbing $CO_2$ gas from ambient air and flue gas sequentially using an alkaline capture solution. At least a portion of the $CO_2$ gas in a first gaseous feed containing ambient air and at least a portion of a second gaseous feed of a flue gas can be removed from their respective feeds consecutively. The alkaline capture solution can be regenerated and recycled by removing at least a portion of the dissolved $CO_2$. In some instances, the example hybrid carbon dioxide system 100 can provide improved energy efficiency by reducing the total energy input needed for removing a unit weight of $CO_2$ from the gaseous feeds; and thus, can reduce the total cost of the $CO_2$ removal process.

As shown in FIG. 1A, the example hybrid carbon dioxide removal system 100 includes a first gas-liquid contactor 102 configured to perform a first absorption reaction by removing at least a portion of the $CO_2$ from the first gaseous feed by dissolving the $CO_2$ in the alkaline capture solution and generating a first $CO_2$-rich alkaline capture solution; a second gas-liquid contactor 104 configured to perform a second absorption reaction by removing at least a portion of the $CO_2$ from the second gaseous feed by dissolving the $CO_2$ in the first $CO_2$-rich alkaline capture solution and generating a second $CO_2$-rich alkaline capture solution; and a third gas-liquid contactor 106 configured to perform a desorption reaction by separating at least a portion of the dissolved $CO_2$ from the second $CO_2$-rich alkaline capture solution and regenerating the alkaline capture solution. In some instances, the second gas-liquid contactor 104 may include an absorption column, a bubbling column, or another type of gas-liquid contactor; the third gas-liquid contactor 106 may be implemented as a desorption column, a stripping column, or another type of reactor/column for removing the dissolved $CO_2$ from the second $CO_2$-rich alkaline capture solution. In some implementations, the second gas-liquid contactor 104 may be implemented as the first gas-liquid contactor 102 with the same or different interfacial surface structure. The hybrid carbon dioxide removal system 100 may include additional or different features, and the components of the hybrid carbon dioxide removal system 100 may operate as described with respect to FIG. 4 or in another manner.

In some implementations, a first flow is directed from the first gaseous feed to interact with the alkaline capture solution in the first gas-liquid contactor 102. In the example shown in FIG. 1A, the first gaseous feed is drawn from ambient air, and the first gas-liquid contactor 102 operates as a direct air capture (DAC) system configured to directly remove $CO_2$ from the ambient air. In some implementations, the first gaseous feed at the gas-liquid contactor 102 has a $CO_2$ concentration below 1000 parts per million (ppm). In the example shown in FIG. 1A, a second flow is direct from the second gaseous feed to interact with the first $CO_2$-rich alkaline capture solution in the second gas-liquid contactor 104; the second gaseous feed includes a flue gas (e.g., from an exhaust manifold of an industrial system or another source); and the second gas-liquid contactor 104 operates as a post combustion capture (PCC) system or point source system configured to remove $CO_2$ from the flue gas. In some instances, the flue gas can be generated from multiple distinct industrial point sources, which may have different concentrations of $CO_2$. The second gaseous feed at the second gas-liquid contactor 104 has a $CO_2$ concentration in a range of above 1%, in a range of 1000 ppm to 100-wt %, 1000 ppm to 95 wt %, or another range. For example, natural gas and ethanol refineries may produce a flue gas with a $CO_2$ concentration up to 80 mole %; iron and steel plant may produce a flue gas with a $CO_2$ concentration in a range of about 20-30 mole %; and coal power plants may produce a flue gas with a $CO_2$ concentration in a range of about 12-15 mole %. In certain instances, the flue gas from the various industrial point sources may have a temperature in a range of 1-800 degrees Celsius.

As shown in FIG. 1A, the first gas-liquid contactor 102 includes a first reactor vessel 144, a first liquid inlet 134A, a first liquid outlet 134B, a first gas inlet 132A, and a first gas outlet 132B; the second gas-liquid contactor 104 includes a second reactor vessel 146, a second liquid inlet 136A, a second liquid outlet 136B, a second gas inlet 138A, and a second gas outlet 138B; and the third gas-liquid contactor 106 includes a third reactor vessel 148, a third liquid inlet 140A, a third liquid outlet 140B, and a third gas outlet 142. The first gas-liquid contactor 102 may include other features and components in some cases.

As shown in FIG. 1A, the first, second, and third gas-liquid contactors 102, 104, 106 are connected in series and are configured to remove $CO_2$ from the first and second gaseous feeds sequentially. In particular, the first liquid inlet 134A is fluidically connected to the third liquid outlet 140B; and is configured to receive a recirculation stream 128 containing the regenerated alkaline capture solution (e.g., a $CO_2$-lean alkaline capture solution) from the third gas-liquid contactor 106. The first liquid outlet 134B is fluidically connected to the second liquid inlet 136A; and is configured to transport the first liquid stream 126A containing the first $CO_2$-rich alkaline capture solution to the second gas-liquid contactor 104. The first gas inlet 132A is configured to receive the first gaseous feed 112 containing ambient air, and the first gas outlet 132B is configured to transport a first gas exhaust stream 122A into atmosphere. In some implementations, the second liquid inlet 136A is configured to receive the first liquid stream 126A from the first gas-liquid contactor 102. The second liquid outlet 136B is fluidically connected to the third liquid inlet 140A; and is configured to transport the second liquid stream 126B containing the second $CO_2$-rich alkaline capture solution to the third gas-liquid contactor 106. The second gas inlet 138A is fluidically connected to an industrial source; and is configured to receive the second gaseous feed 114 containing the flue gas, and the second gas outlet 138B is configured to transport a second gas exhaust stream 122B, for example into atmosphere or into another down-stream processing system for further processing. The third liquid outlet 140B is fluidically connected to the first liquid inlet 134A; and is configured to transport the regenerated alkaline capture solution back to the first gas-liquid contactor 102 for recirculating the alkaline capture solution used in the first absorption reaction. The third gas outlet 142 is configured to transport a third gas exhaust stream 124 containing $CO_2$ with a concentration in a range of 91-100-wt %.

In some implementations, the alkaline capture solution is an aqueous solution containing a dissolved salt in a form of a[Q+]b[X−]. The symbol "Q" represents a cation species, for example, $NH_4^+$, $N(CH_3)_4^+$, $N(ethyl)_4^+$, $N(Butyl)_4^+$, $N(Propyl)_4^+$, $K^+$, $Na^+$, $Ca^{2+}$, or $Mg^{2+}$. The symbol "X" represents an anion species, for example, $OH^-$, $O^{2-}$, $CO_3^{2-}$, $HCO_3^-$, $Cl^-$, $Br^-$, or $I^-$. The symbols "a" and "b" are integers such that the total charge of the water containing the dissolved salt is neutral. In some instances, the alkaline capture solution may include water, alcohol, glycols, glycerol, polyglycols, glycol ethers, or other chemicals. In some instances, the water may include gray water, brackish water, saline water, or ocean water. In some implementations, the alkaline capture solution includes a weak base of the general formula of $(M)_x(CO_3)_y$ and or $M_x(OH)_y$, where M may include potassium (K), sodium (Na), ammonium ($NH_4$), quaternary ammonium, vanadium (V), platinum (Pt), palladium (Pd), rhodium (Rh), ruthenium (Ru), chromium (Cr), copper (Cu), calcium (Ca), lithium (Li), bismuth (Bi), nickel (Ni), cobalt (Co), manganese (Mn), iron (Fe), molybdenum (Mo), or other ions. The weak base in the alkaline capture solution can have a weight concentration in a range of 0.0001-100% in the alkaline capture solution. In some implementations, the alkaline capture solution further includes a free amino acid. In some implementations, the alkaline capture solution includes a carboxylic acid salt of an amino acid dissolved in water with a weight concentration of 0.0001-100%, 0.001-80%, 0.01-60%, 0.1-40%, 1-20%, or another range. In some instances, the pH value of the alkaline capture solution is in a range of 11-14.

In some implementations, the alkaline capture solution further includes an anti-corrosive agent, an anti-foaming agent, additives, or promoters. The anti-corrosive agent can be vanadium pentoxide or other metallic oxides; and the additives or promoters can be MEA (monoethanolamine), DEA (diethanolamine), TEA (triethanolamine), MDEA (methyl diethanolamine), piperazine, or other free amines, $KVO_3$ (potassium metavanadate), or another type of material. The anti-foaming agent can be inert liquid chemicals such as mineral oil, silicon, and/or hydrophobic polyol, a hydrophobic solid, such as hydrophobic silica, ethylene-bis-stearamide, fatty acid, and/or fatty alcohol. In some instances, the anti-foaming agent is insoluble in the alkaline capture solution. In some instances, the anti-foaming agent may be silicone based or non-silicon based.

In some implementations, the alkaline capture solution includes a phase transfer catalyst or agent with the structure in a form of $c[M^+]d[Y^-]$. The phase transfer catalysts are added to the alkaline capture solution to reduce interfacial surface tension and promote mixing in gas-liquid or gas-liquid-solid systems. The symbol "M" represents a cation species; and the symbol "Y" represents an anion species. The symbols "c" and "d" are integers such that the total charge is neutral. In some implementations, the phase transfer catalyst has a form of $M\text{-}O\text{---}(OH)_x$, where M is Pt, Pd, Ru, V, Cu, Al, Cr, Co, Ni, Mo, or Ti. In some instances, the phase transfer catalyst in the alkaline capture solution may be an aqueous ionic base in a form of $M^+Y^-$, where M can be tetrabutyl ammonium, tetramethylammonium, trimethyl butyl ammonium, ethyltrimethyl ammonium, ethyl methyl butyl ammonium, diethyl dimethyl ammonium or other alkylammonium species; and Y can be hydroxide ($OH^-$), fluorine ($F^-$), carbonate ($CO_3^{2-}$), bicarbonate ($HCO_3^-$), or other anions. In some implementations, the phase transfer catalyst in the alkaline capture solution has a weight concentration of 0.001-100% or in another range. In some instances, the alkaline capture solution can maintain a $CO_2$ capture rate equal to or greater than 75% of the $CO_2$ capture rate and/or quantity during the first cycle through 10-5000 cycles.

As shown in FIG. 1A, the first gas-liquid contactor 102 includes a first monitoring unit 152A which may include a pH sensor, a bicarbonate sensor, a temperature sensor, or a combination of these or other types of sensors. The first monitoring unit 152A is communicably connected to a control system 156 which can be used to read signals from the first monitoring unit 152A and to determine the characteristics of the liquid in the first gas-liquid contactor 102, e.g., the pH value, the bicarbonate concentration, the temperature, the concentration of dissolved $CO_2$, or other characteristics of the liquid in the first gas-liquid contactor 102. In some implementations, the second gas-liquid contactor 104 includes a second monitoring unit 152B which may include a pH sensor, a bicarbonate sensor, a temperature sensor, or a combination of these or other types of sensors. In some instances, the second monitoring unit 152B may be implemented as the first monitoring unit 152A in the first gas-liquid contactor 102. Similarly, the second monitoring unit 152B is communicably connected to the control system 156 which can be used to measure and determine the characteristics of the liquid in the second gas-liquid contactor 104, e.g., the pH value, the bicarbonate concentration, the temperature, the concentration of dissolved $CO_2$, or other characteristics of the liquid in the second gas-liquid contactor 104. In some instances, the first gas-liquid contactor 102 may include multiple first monitoring units 152A; and the second gas-liquid contactor 104 may include multiple second monitoring units 152B. In some instances, the first and second gas-liquid contactors 102, 104 may include other types of sensors to monitor liquid level, flow rate, purity, density, weight, and other operation conditions. In some instances, the first and second monitoring devices 152A, 152B may include measurement or analytical instrumentation such as in-situ Raman or infrared (IR) spectroscopy for yield sensing, gas chromatography, mass spectrometry, an autotitrator, or other types of monitoring devices. In some instances, the first and second gas-liquid contactors 102, 104 may include other components or elements. For example, the first and second gas-liquid contactors 102,104 may each include a pump, an air mover, a demister, and other components. In some instances, the first gas-liquid contactor 102 may be implemented as the example gas-liquid contactor 300 in FIG. 3 or in another manner. Components of the first and second gas-liquid contactors 102, 104 may be communicably connected to and controlled by the control system 156. For example, the pump of the first gas-liquid contactor 102 can be activated to pump the first liquid stream 126A, and the air mover of the first gas-liquid contactor 102 can be stopped, when the concentration of the dissolved $CO_2$ in the first $CO_2$-rich alkaline capture solution in the first gas-liquid contactor 102 reaches a first predetermined threshold value. For another example, the pump of the second gas-liquid contactor 104 can be activated to pump the second liquid stream 126B and the air mover of the second gas-liquid contactor 104 can be stopped, when the concentration of the dissolved $CO_2$ in the second $CO_2$-rich alkaline capture solution in the second gas-liquid contactor 104 reaches a second predetermined threshold value. In some instances, the control system 156 may be configured to perform other operations.

In some implementations, the third gas-liquid contactor 106 is a multi-tray stripping or desorption column to produce pure or high purity $CO_2$ gas during desorption and regenerate the alkaline capture solution which can be recycled and used in the first absorption reaction in the first gas-liquid contactor 102. In some instances, the third gas-liquid contactor 106 can receive heat, generated by operation of a heating unit 154. The heating unit 154 may operate based on steam generated utilizing a solar heating system, an electric or hybrid reboiler, waste heat from industrial manufacturing, refineries, power plants, nuclear power plants, geothermal heat, low-pressure steam, windmill, or other forms of heat. In some instances, the third gas-liquid contactor 106 may include industrial moisture recovery systems to prevent any water loss. In some instances, the heating unit 154 is configured to heat the second $CO_2$-rich alkaline capture solution in the third gas-liquid contactor 106 to a temperature less than 200 degrees Celsius, e.g., in a range of 90-150° C., to reversibly release at least a portion of the dissolved $CO_2$ from the second $CO_2$-rich alkaline capture solution with a conversion efficiency in a range of 30-100% and a selectivity in a range of 93-100%. The gas exhausted from the third gas outlet 142 includes $CO_2$ with a concentration in a range of 91-100%. The gas exhaust from the third gas outlet 142 may be collected and compressed for sequestration or utilization in other applications. In some instances, the heating unit 154 may include a solar heating system, a gas-powered, fully electric or hybrid steam reboiler, or other types of heating systems. In some instances, waste heat from any industry or any manufacturing or processing units including geothermal, battery metals mining and purifications, metal smelting processes, cement plants, glass manufacturing, biochar production, power plants, nuclear plants, fertilizer industries, chemical manufacturing, and oil refineries, may be used to power the heating unit 154 for the desorption process in the third gas-liquid contactor 106. The regenerated alkaline capture solution may be stored and circulated back to the first gas-liquid contactor 102 for the first absorption reaction. In some instances, the regenerated alkaline capture solution includes a $CO_2$-lean alkaline capture solution with a baseline or a negligible level of dissolved $CO_2$ concentration. In some instances, the $CO_2$-lean alkaline capture solution or the regenerated alkaline capture solution has a pH value in a range of 11-14.

During operation, the interfacial surface structure in the first gas-liquid contactor 102 is wetted by the alkaline capture solution; a first flow from the first gaseous feed 112 is directed across the interfacial surface structure in the first gas-liquid contactor 102; and $CO_2$ in the first gaseous feed 112 dissolves in the alkaline capture solution. The $CO_2$ concentration in the alkaline capture solution increases over time, thus forming the first $CO_2$-rich alkaline capture solution. In some implementations, the $CO_2$ concentration in the first $CO_2$-rich alkaline capture solution formed over time is greater than the $CO_2$ concentration of the initial alkaline capture solution. The pH value of the alkaline capture solution in the first gas-liquid contactor 102 can be monitored in real-time or periodically, by operation of the first monitoring unit 152A. In response to detecting that the first $CO_2$-rich alkaline capture solution meets one or more predetermined criteria, a flow of the first liquid stream 126A can be activated. The predetermined criteria may include, for example, the $CO_2$ concentration of the first $CO_2$-rich alkaline capture solution being greater than a first $CO_2$ concentration threshold value (e.g., 1 mol %, 5 mol %, 10 mol %, 20 mol %, 50 mol %, 65 mol % or another value) or being within a first $CO_2$ concentration range (e.g., 1-65 mol %) which corresponds to the pH value of the first $CO_2$-rich alkaline capture solution being equal to or less than a pH threshold value (<14) or being within a first pH range (e.g., 7-12). As shown in FIG. 1A, when the flow of the first liquid stream 126A is activated, the first $CO_2$-rich alkaline capture solution is transported from the first gas-liquid contactor 102 to the second gas-liquid contactor 104.

In certain instances, solid particles may be formed and precipitate in the first and second $CO_2$-rich alkaline capture solutions during the first and second absorption reactions depending on the extent of the reaction progress in the first gas-liquid contactor 102 and second gas-liquid contactor 104. For example, when the $CO_2$-Base complex precipitates out from the first $CO_2$-rich alkaline capture solution during the first absorption reaction, a $CO_2$-Base containing complex may be formed on the interfacial surface structure or suspended in the first $CO_2$-rich alkaline capture solution. After each absorption steps, the solids may be collected through a wash down or mechanical shake down from the interfacial surface structures or filtered out from the first $CO_2$-rich alkaline capture solution prior to being transferred to the second gas-liquid contactor 104. The filtered solid then desorbed in a furnace or oven to get 98-100% $CO_2$ gas. In some instances, the solids left in the solution as slurry and pumped into the third gas-liquid contactor 106 to strip off $CO_2$ gas at 95-120 degree Celsius.

As shown in FIG. 1A, the second gas-liquid contactor 104 receives the first liquid stream 126A containing the first $CO_2$-rich alkaline capture solution from the first gas-liquid contactor 102; and consecutively or simultaneously, receives the second flow from the second gaseous feed 114. The second flow does not include gas from the ambient air. In other words, the second flow from the second gaseous feed 114 to the second gas-liquid contactor is independent of the first gaseous feed 112. The second gaseous feed 114 is directed through the first $CO_2$-rich alkaline capture solution in the second gas-liquid contactor 104; and at least a portion of the $CO_2$ in the second gaseous feed 114 is dissolved in the first $CO_2$-rich alkaline capture solution forming the second $CO_2$-rich alkaline capture solution. For example, when the second gas-liquid contactor 104 is a bubble column, a flow of the second gaseous feed 114 may be bubbled into the first $CO_2$-rich alkaline capture solution through a bubbler in the second gas-liquid contactor 104. For another example, when the second gas-liquid contactor 104 is an autoclave, a flow of the second gaseous feed 114 may feed into a head space of the second gas-liquid contactor 104 and allow the $CO_2$ in the second gaseous feed 114 to dissolve through the gas-liquid interface in the second gas-liquid contactor 104. In some instances, the flow of the second gaseous feed may be directed through the second gas-liquid contactor 104 in another manner. The $CO_2$ concentration of the second $CO_2$-rich alkaline capture solution increases over time; and is greater than the $CO_2$ concentration of the first $CO_2$-rich alkaline capture solution. The pH value of the second $CO_2$-rich alkaline capture solution in the second gas-liquid contactor 104 is monitored in real-time or periodically, by operation of the second monitoring unit 152B. In some implementations, the pH value of the second $CO_2$-rich alkaline capture solution in the second gas-liquid contactor 104 is in a range of 7-9.

In response to the second $CO_2$-rich alkaline capture solution meeting one or more predetermined criteria, a flow of the second liquid stream 126B can be activated. The predetermined criteria can include, for example, the $CO_2$ concentration of the second $CO_2$-rich alkaline capture solution being greater than a second $CO_2$ concentration threshold value (e.g., 20 mol %, 30 mol %, 40 mol %, 50 mol %, 70 mol %, 80 mol %, 90 mol %, 100 mol %, or another value) or being within a second $CO_2$ concentration range 20-100 mol % which corresponds to the pH value of the second $CO_2$-rich alkaline capture solution being equal to or less than a pH threshold value (e.g., <9.5) or being within a range (e.g., 7-9.5). As shown in FIG. 1A, when the flow of the second liquid stream 126B is activated, the second $CO_2$-rich alkaline capture solution is transported from the second gas-liquid contactor 104 to the third gas-liquid contactor 106. In some instances, the second gaseous output stream 122B may include $N_2$ and $O_2$.

In some instances, the ambient air and the flue gas may include nitrogen oxides ($NO_x$), sulfur oxide ($SO_x$), or other gases. The $NO_x$ and $SO_x$ in the ambient air and flue gas may be absorbed by the alkaline capture solution or the first $CO_2$-rich alkaline capture solution in the first and second gas-liquid contactors 102, 104, respectively. Precipitation may be formed in the alkaline capture solution or the first $CO_2$-rich alkaline capture solution. In some instances, the hybrid carbon dioxide removal system 100 may include one or more inline filters (e.g., containing active charcoal or another material) configured to filter out the precipitation formed from the absorption of the $NO_x$ and $SO_x$ in the alkaline capture solution or the first $CO_2$-rich alkaline capture solution, prior to being transferred to the second gas-liquid contactor 104 or the third gas-liquid contactor 106, respectively.

In some implementations, the third gaseous output 124 of the third gas-liquid contactor 106 includes $CO_2$ gas having a purity in a range of 91-100 wt % or another range. The $CO_2$ gas obtained during the desorption process may be compressed and used as a low global warming refrigerant, in green houses for enhanced productivity, welding, feedstock for urea and to other useful chemicals and/or liquid fuels, to provide low global warming heating or cooling, used as feedstock for urea other useful chemicals, fuels, concrete/cement, as a blowing agent, carbonated beverages, or sequestered underground in geological formations or offshore or onshore depleted oil fields where the $CO_2$ gas can be stored (e.g., sequestration), or in other applications.

In some instances, the example carbon dioxide removal system 100 may include various fluid handling components, including valves, pumps, pipes, air movers, etc. for controlling the flow of liquids and gases. In some instances, the control system 156 is configured to communicate with the first and second monitoring units 152A, 152B and the various fluid handling components (e.g., the pump 108), the heating element 154 of the third gas-liquid contactor 106 for controlling the desorption reaction in the third gas-liquid contactor 106. In some implementations, the control system 156 may include computation apparatus, a memory unit, an input/output interface, or other components that allow the communication of the control system with other components of the example carbon dioxide removal system 100, determine control parameter values of the components of the example carbon dioxide removal system 100, and optimize the carbon dioxide removing performance of the example carbon dioxide removal system 100. In some instances, the control system may be configured for performing other functions.

In some implementations, the hybrid carbon dioxide removal system 100 includes gas-solid contactors with solid adsorbents instead of gas-liquid contactors. In some instances, the tubular continuous flow gas-solid contactor may be filled with anyone of a high surface area (e.g., 150-2000 sqm/g) palettized with or without amine treated or amine grafted porous materials such as zeolites, molecular sieves, metal oxide frameworks (MOF) materials, pretreated activated charcoals, resins, noble metal impregnated solid adsorbents, filters, solid KOH, solid $K_2CO_3$, solid amino acids, of all of the above, 3D printed solid structures made out of any of those above. In some instances, $CO_2$ gas in a range of 44-100 kg or another range can be captured per ton of solid adsorbents using only ambient air as the feedstock. In some instances, $CO_2$ gas in a range of 150 kg or more can be captured per ton of solid adsorbents when ambient air and flue gases are alternated in the gaseous feed stream. The adsorption step can run at a temperature in a range of −30 to 25 degree Celsius. The desorption reaction can occur at a temperature in a range of 110-200 degree Celsius with or without applying vacuum.

Figure 1B:
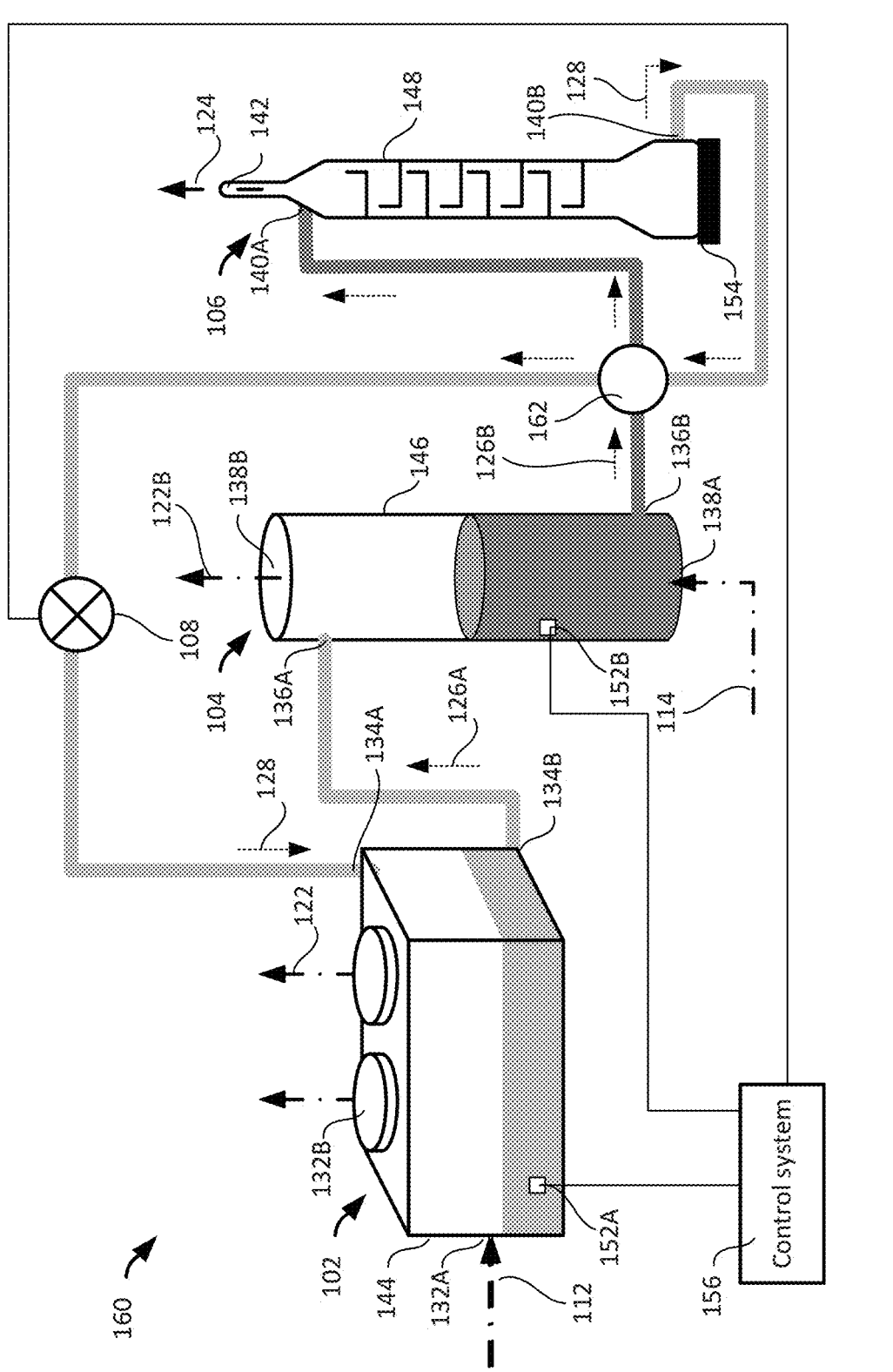
FIG. 1B is a schematic diagram showing aspects of an example hybrid carbon dioxide removal system.

FIG. 1B is a schematic diagram showing aspects of an example hybrid carbon dioxide removal system 160. In some implementations, the hybrid carbon dioxide removal system 160 is configured to perform a carbon dioxide ($CO_2$) capture and removal process by absorbing $CO_2$ gas from ambient air and flue gas sequentially using an alkaline capture solution. At least a portion of the $CO_2$ gas in a first gaseous feed containing ambient air and at least a portion of the $CO_2$ gas in a second gaseous feed containing a flue gas can be removed from their respective feeds consecutively. The alkaline capture solution can be regenerated and recycled by removing at least a portion of the dissolved $CO_2$. In some instances, the example hybrid carbon dioxide system 160 can provide improved energy efficiency by reducing the total energy input needed for removing a unit weight of $CO_2$ from the gaseous feeds; and thus, can reduce the total cost of the $CO_2$ removal process.

Figure 4:
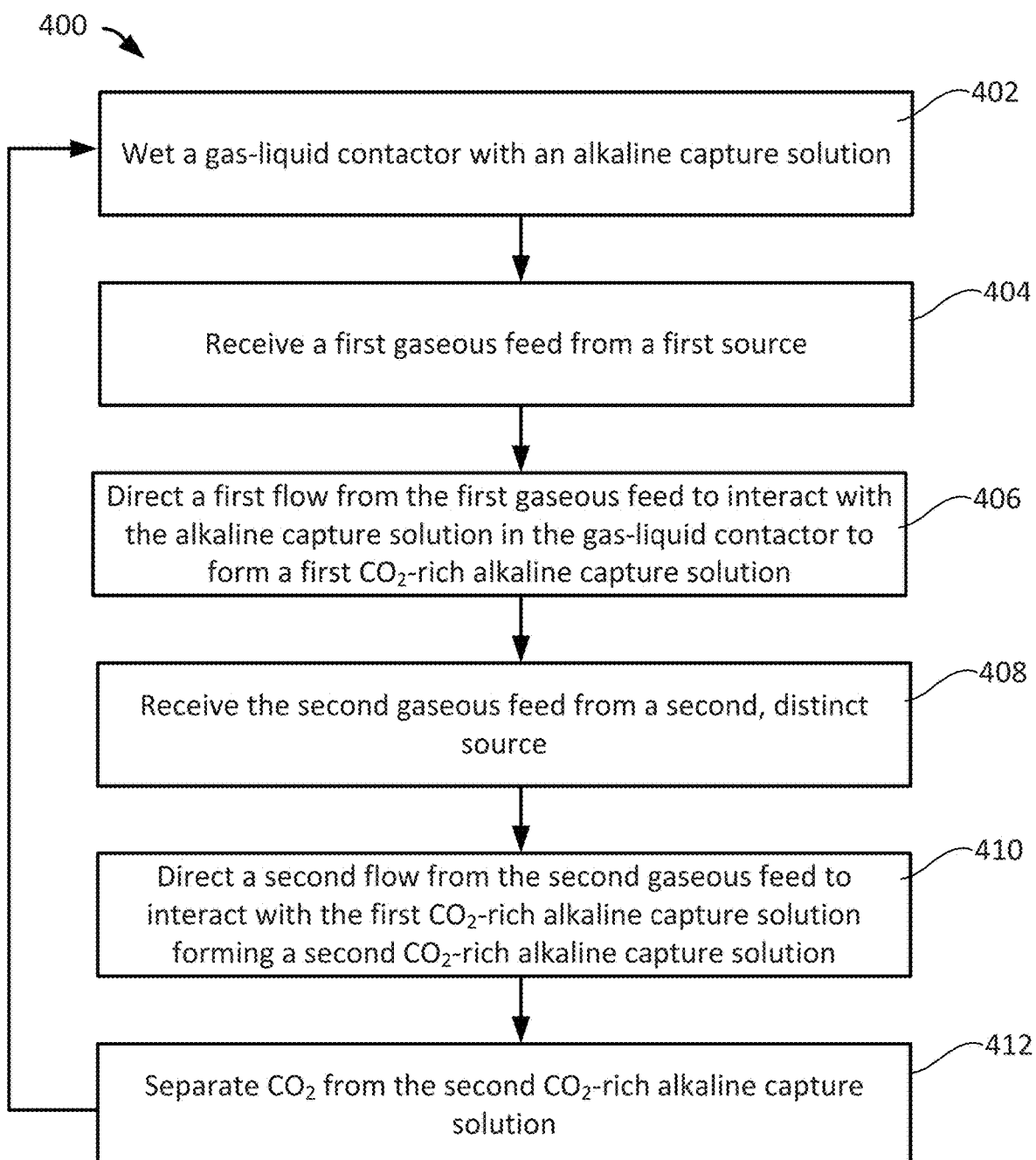
FIG. 4 is a flow chart showing an example process for removing carbon dioxide gas from two distinct gaseous feeds.

As shown in FIG. 1B, components of the example hybrid carbon dioxide removal system 160 may be implemented as the respective components of the example hybrid carbon dioxide removal system 100 shown in FIG. 1A and operated as described in the operations of the example process 400 in FIG. 4. The example hybrid carbon dioxide removal system 160 includes a heat exchanger 162. In some instances, during the desorption reaction in the third gas-liquid contactor 106, the second $CO_2$-rich alkaline capture solution is heated by operation of the heating element 154, such that the $CO_2$-lean alkaline capture solution in the third gas-liquid contactor 106 may have a temperature in a range of 0-120 degree Celsius. The heat exchanger 162 is configured to recycle at least a portion of the heat energy from the $CO_2$-lean alkaline capture solution, and allow heat transfer between the second liquid stream 126B and the recirculation stream 128. In particular, the heat exchanger 162 is configured to transfer heat from the $CO_2$-lean alkaline capture solution in the recirculation stream 128 from the third gas-liquid contactor 106 to the second $CO_2$-rich alkaline capture solution in the second liquid stream 126B from the second gas-liquid contactor 104. In some instances, the heat exchanger 162 may have a shell-tube structure, a stacked-plate structure, or another structure.

Figure 1C:
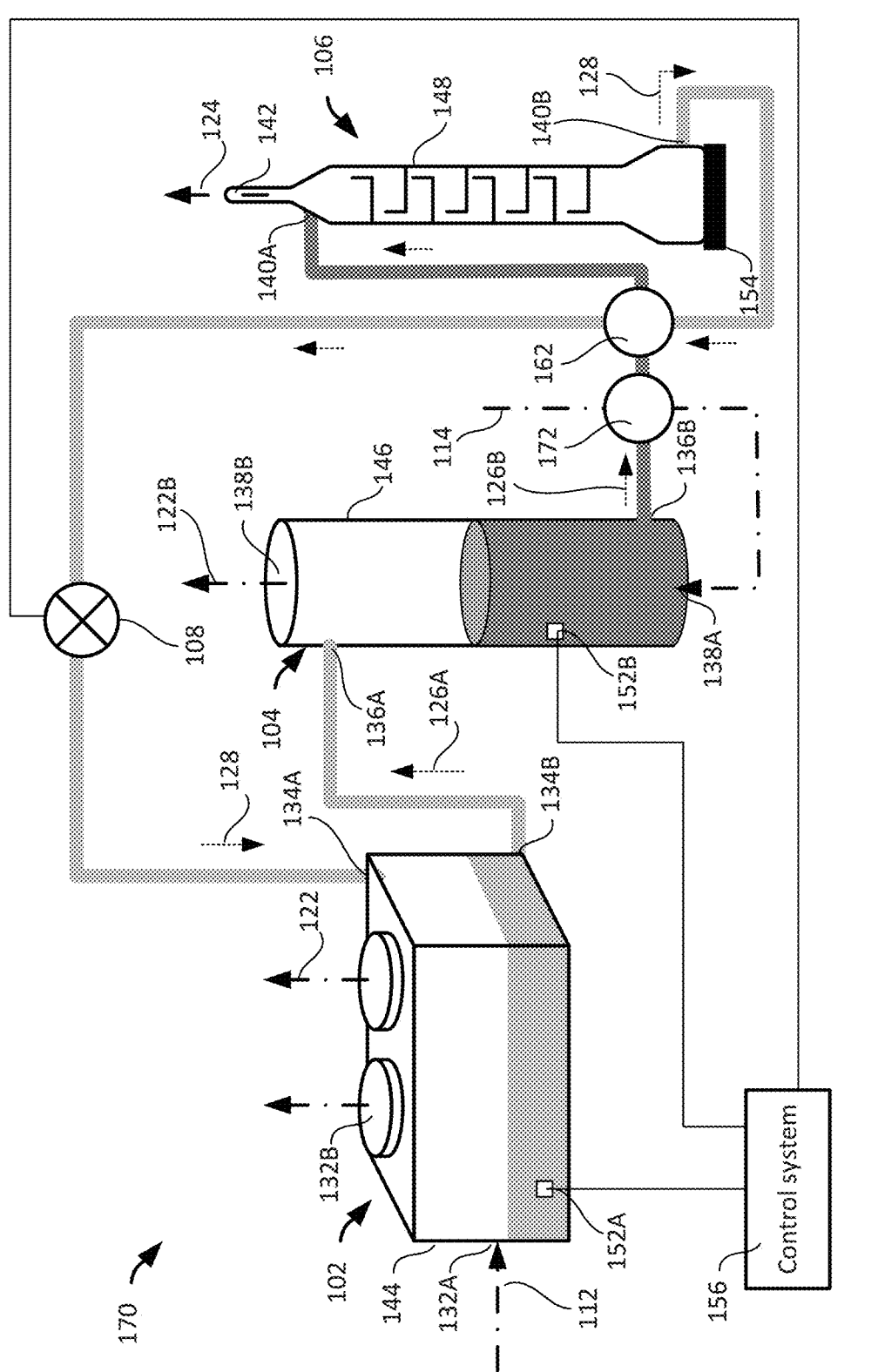
FIG. 1C is a schematic diagram showing aspects of an example hybrid carbon dioxide removal system.

FIG. 1C is a schematic diagram showing aspects of an example hybrid carbon dioxide removal system 170. In some implementations, the hybrid carbon dioxide removal system 170 is configured to perform a carbon dioxide ($CO_2$) capture and removal process by absorbing $CO_2$ gas from ambient air and flue gas sequentially using an alkaline capture solution. At least a portion of the $CO_2$ gas in a first gaseous feed containing ambient air and at least a portion of a second gaseous feed containing a flue gas can be removed from their respective feeds consecutively. The alkaline capture solution can be regenerated and recycled by removing at least a portion of the dissolved $CO_2$. In some instances, the example hybrid carbon dioxide system 170 can provide improved energy efficiency by reducing the total energy input needed for removing a unit weight of $CO_2$ from the gaseous feeds; and thus, can reduce the total cost of the $CO_2$ removal process.

As shown in FIG. 1C, components of the example hybrid carbon dioxide removal system 170 may be implemented as the respective components of the example hybrid carbon dioxide removal system 160 shown in FIG. 1A. The example hybrid carbon dioxide removal system 170 further includes a second heat exchanger 172. In some instances, the second gaseous feed 114 has a temperature in a range of 0-120 degree Celsius. The heat exchanger 172 is configured to recycle at least a portion of the heat energy from the second gaseous feed 114, and to allow heat transfer between the second liquid stream 126B and the second gaseous feed 114. In particular, the heat exchanger 172 is configured to transfer heat from the flue gas in the second gaseous feed 114 (e.g., from a point source) to the second $CO_2$-rich alkaline capture solution in the second liquid stream 126B (from the second gas-liquid contactor 104). In some instances, the heat exchanger 172 may be an indirect heat exchanger having a shell-tube structure, a stacked-plate structure, or another structure. In this case, the second liquid stream 126B, prior going through the first heat exchanger 162, is passed through the second heat exchanger 172. In some instances, the second liquid stream 126B is passed through the first heat exchanger 162 prior to being passed through the second heat exchanger 172 based on the temperatures of the second gaseous feed 114, the second liquid stream 126B, and the recirculation stream 128.

Figure 2A:
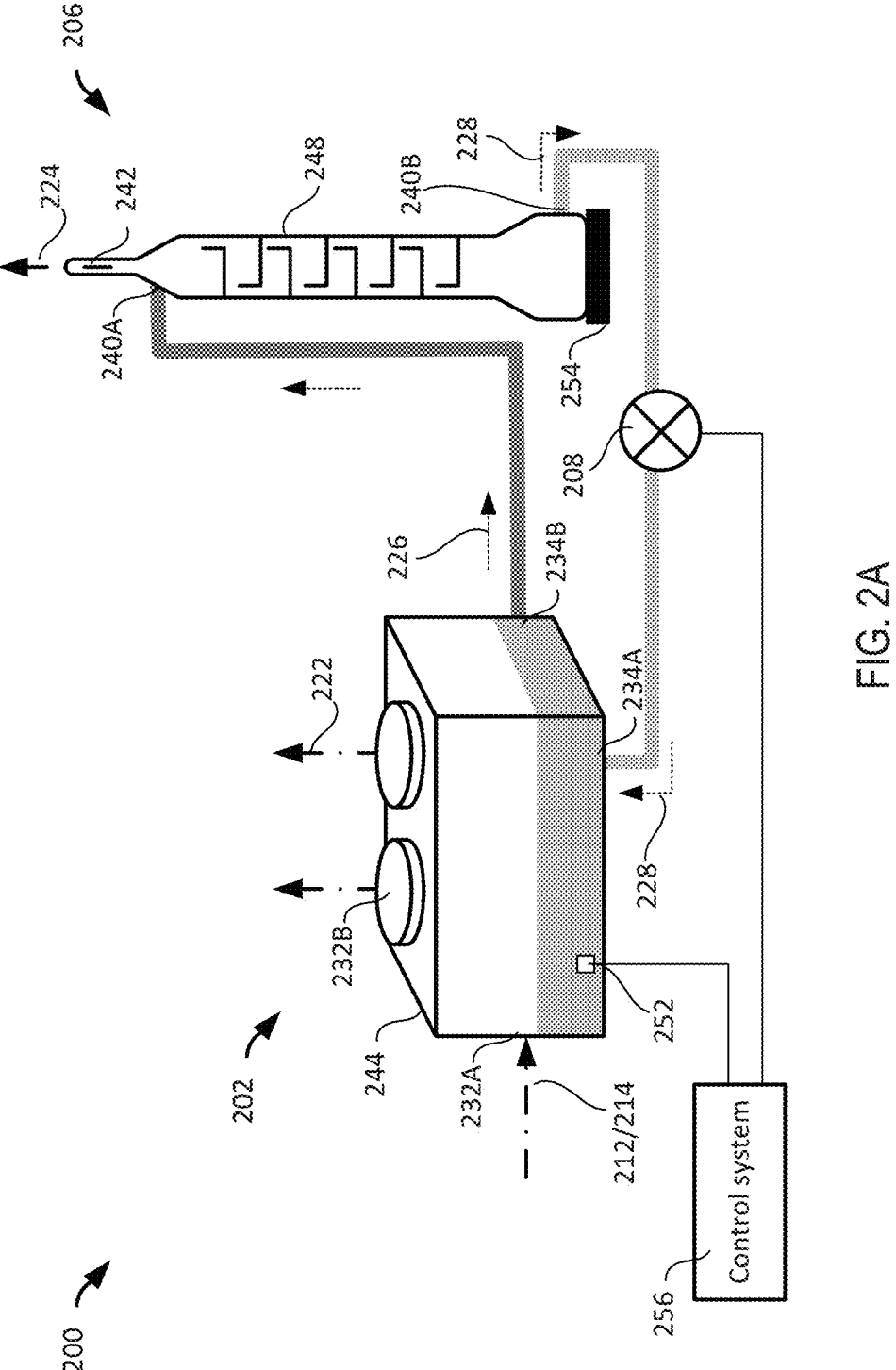
FIG. 2A is a schematic diagram showing aspects of an example hybrid carbon dioxide removal system.

FIG. 2A is a schematic diagram showing aspects of an example hybrid carbon dioxide removal system 200. In some implementations, the hybrid carbon dioxide removal system 200 is configured to perform a carbon dioxide ($CO_2$) capture and removal process by absorbing $CO_2$ gas from ambient air and flue gas sequentially using an alkaline capture solution. At least a portion of the $CO_2$ gas from the ambient air and at least a portion of the $CO_2$ gas from the flue gas can be removed consecutively; and the alkaline capture solution can be regenerated and recycled by removing at least a portion of the dissolved $CO_2$. In some instances, the example hybrid carbon dioxide system 200 can provide improved energy efficiency by reducing the total energy input needed per a unit weight of removed; and thus, can reduce the total cost of the $CO_2$ removal process. In some instances, the systems and methods presented here can provide other advantages over conventional carbon oxide removal processes.

As shown in FIG. 2A, the example hybrid carbon dioxide removal system 200 includes a first gas-liquid contactor 202 configured to perform a first absorption reaction during a first time period by removing at least a portion of the $CO_2$ from a first gaseous feed containing ambient air by dissolving the $CO_2$ from the ambient air into the alkaline capture solution, thereby forming a first $CO_2$-rich alkaline capture solution. The first gas-liquid contactor 202 is also configured to perform a second absorption reaction during a second time period by removing at least a portion of the $CO_2$ from a second gaseous feed containing a flue gas by dissolving the $CO_2$ from the flue gas into the first $CO_2$-rich alkaline capture solution, thereby forming a second $CO_2$-rich alkaline capture solution. The example hybrid carbon dioxide removal system 200 further include a second gas-liquid contactor 206 configured to perform a desorption reaction by separating at least a portion of the dissolved $CO_2$ from the second $CO_2$-rich alkaline capture solution and regenerating the alkaline capture solution.

In some instances, the first gas-liquid contactor 202 includes an interfacial surface structure. The first and second gaseous feeds can be passed through the interfacial surface structure in the first gas-liquid contactor 202. Surfaces of the interfacial surface structure are wetted by the alkaline capture solution or the first $CO_2$-rich alkaline capture solution, which the $CO_2$ gas from the first and second gaseous feeds diffuses into, respectively. In some instances, the first gas-liquid contactor 202 may be implemented as the example gas-liquid contactor 300 in FIG. 3 or in another manner. In some instances, the second gas-liquid contactor 206 may be implemented as a desorption column, a stripping column, or another type of gas-liquid contactor for removing the dissolved $CO_2$ from the second $CO_2$-rich alkaline capture solution. The hybrid carbon dioxide removal system 200 may include additional or different features, and the components of the hybrid carbon dioxide removal system 200 may operate as described with respect to FIG. 4 or in another manner. For example, the hybrid carbon dioxide removal system 200 may include multiple first gas-liquid contactors 202 and multiple second gas-liquid contactors 204. In some instances, the number of first gas-liquid contactors 202 may be different from the number of second gas-liquid contactors 204.

In some implementations, a first flow is directed from the first gaseous feed 212 to interact with the alkaline capture solution on the surfaces of the interfacial surface structure in the first gas-liquid contactor 202 during a first time period; the first gaseous feed is drawn from ambient air; and the first gas-liquid contactor 202 operates as a direct air capture (DAC) system configured to directly remove $CO_2$ from the ambient air. The first gaseous feed at the gas-liquid contactor 202 has a $CO_2$ concentration below 1000 parts per million (ppm). As shown in FIG. 2A, a second flow is direct from the second gaseous feed 214 to interact with the first $CO_2$-rich alkaline capture solution on the surfaces of the interfacial surface structure in the first gas-liquid contactor 202 during a second time period; the second gaseous feed includes a flue gas (e.g., from an exhaust manifold of an industrial system or another source); and the first gas-liquid contactor 202 operates as a post combustion capture (PCC) system or point source system configured to remove $CO_2$ from the flue gas. In some instances, the flue gas can be generated from multiple distinct large industrial point sources, which may have different concentrations of $CO_2$. The second gaseous feed has a $CO_2$ concentration in a range of above 1%, in a range of 1000 ppm to 40 wt %, or another range.

As shown in FIG. 2A, the first gas-liquid contactor 202 includes a first reactor vessel 244, a first liquid inlet 234A, a first liquid outlet 234B, a first gas inlet 232A, and a first gas outlet 232B; and the second gas-liquid contactor 206 includes a second reactor vessel 248, a second liquid inlet 240A, a second liquid outlet 240B, and a second gas outlet 242. The first gas-liquid contactor 202 may include other features and components in some cases.

As shown in FIG. 2A, the first and second gas-liquid contactors 202, 206 are connected in series and are configured to remove $CO_2$ from the first and second gaseous feeds sequentially. In particular, the first liquid inlet 234A is fluidically connected to the second liquid outlet 240B; and is configured to receive a recirculation stream 228 containing the regenerated alkaline capture solution (e.g., a $CO_2$-lean alkaline capture solution) from the second gas-liquid contactor 206. The first liquid outlet 234B is fluidically connected to the second liquid inlet 240A; and is configured to transport the first liquid stream 226 containing the second $CO_2$-rich alkaline capture solution to the second gas-liquid contactor 206. The first gas inlet 232A is configured to receive the first gaseous feed 212 containing ambient air during the first time period for performing the first absorption reaction; and to receive the second gaseous feed 214 during the second time period for performing the second absorption reaction, and the first gas outlet 232B is configured to transport a first gas exhaust stream 222 into atmosphere or into another down-stream processing system for further processing. In some implementations, the second liquid inlet 240A is configured to receive the first liquid stream 226 from the first gas-liquid contactor 202. The second liquid outlet 240B is fluidically connected to the first liquid inlet 234A; and is configured to transport the regenerated alkaline capture solution back to the first gas-liquid contactor 202 for recirculating the alkaline capture solution used in the first absorption reaction. The second gas outlet 242 is configured to transport a second gas exhaust stream 224 containing $CO_2$ with a concentration in a range of 91-100%.

As shown in FIG. 2A, the first gas-liquid contactor 202 includes a monitoring unit 252 which may include a pH sensor, a bicarbonate sensor, a temperature sensor, or other types of sensors. The monitoring unit 252 is communicably connected to a control system 256 which can be used to read signals from the monitoring unit 252 and to determine the characteristics of the liquid in the first gas-liquid contactor 202, e.g., the pH value, the bicarbonate concentration, the temperature, the concentration of dissolved $CO_2$, or other characteristics of the liquid in the first gas-liquid contactor 202. In some instances, the first gas-liquid contactor 202 may include multiple monitoring units 252. In some instances, the first gas-liquid contactor 202 may include other types of sensors to monitor liquid level, flow rate, purity, density, weight, and other operation conditions. In some instances, the monitoring device 252 may include measurement or analytical instrumentation such as in-situ Raman or infrared (IR) spectroscopy for yield sensing, gas chromatography, mass spectrometry, an autotitrator, or other types of monitoring devices.

In some instances, the first gas-liquid contactor 202 may include other components or elements. For example, the first gas-liquid contactor 202 may include a pump, an air mover, a demister, and other components. Components of the first gas-liquid contactor 202 may be communicably connected to and controlled by the control system 256. For example, the first gas-liquid contactor 202 can include a pump that circulates the alkaline capture solution through the interfacial surface structure in the first gas-liquid contactor 202 during the first time period for absorbing $CO_2$ from the first gaseous feed; and the pump can also circulate the first $CO_2$-rich alkaline capture solution through the interfacial surface structure in the first gas-liquid contactor 202 during the second time period for absorbing $CO_2$ from the second gaseous feed. For another example, the air mover that directs the first flow of the first gaseous feed can be stopped, for example, when the concentration of the dissolved $CO_2$ in the first $CO_2$-rich alkaline capture solution in the first gas-liquid contactor 202 reaches a first predetermined threshold value; and the air mover can be stopped, for example, when the concentration of the dissolved $CO_2$ in the second $CO_2$-rich alkaline capture solution in the first gas-liquid contactor 202 reaches a second predetermined threshold value. The first gas-liquid contactor 202 may include another pump, which can be activated to pump the first liquid stream 226 to transfer the second $CO_2$-rich alkaline capture solution to the second gas-liquid contactor 206. For example, the air mover can be kept running when switching from the flow of the first gaseous feed to the flow of the second gaseous feed. In some cases, when the second $CO_2$-rich alkaline capture solution has been transferred out of the first gas-liquid contactor 202 and the regenerated alkaline capture solution is received at the first gas-liquid contactor 202, the air mover to direct the flow of the first gaseous feed can be activated. In some instances, the control system 256 may be configured to perform other control operations.

In some implementations, the second gas-liquid contactor 206 is a multi-tray stripping or desorption column to produce pure or high purity $CO_2$ gas during desorption and regenerate the alkaline capture solution which can be recycled and used in the first absorption reaction in the first gas-liquid contactor 202. In some instances, the second gas-liquid contactor 206 can receive heat, by operation of a heating unit 254 which may be operated based on steam generated utilizing solar heating system, electric or hybrid reboiler, waste heat from industrial manufacturing, refineries, power plants, nuclear power plants, geothermal heat, low-pressure steam, or other forms of heat. In some instances, the second gas-liquid contactor 206 may include industrial moisture recovery systems to prevent any water loss. In some instances, the heating unit 254 is configured to heat the second $CO_2$-rich alkaline capture solution in the second gas-liquid contactor 206 to a temperature less than 200 degrees Celsius, e.g., in a range of 90-150° C., to reversibly release at least a portion of the dissolved $CO_2$ from the second $CO_2$-rich alkaline capture solution with a conversion efficiency in a range of 30-100% and a selectivity in a range of 93-100%. The gas exhausted from the second gas outlet 242 includes $CO_2$ with a concentration in a range of 91-100%. The gas exhaust from the second gas outlet 242 may be collected and compressed for sequestration or utilization in other applications. In some instances, the heating unit 254 may include a solar heating system, a gas-powered, fully electric or hybrid steam reboiler, or other types of heating systems. In some instances, waste heat from any industry or any manufacturing or processing units including geothermal, battery metals mining and purifications, metal smelting processes, cement plants, glass manufacturing, biochar production, power plants, nuclear plants, fertilizer industries, chemical manufacturing, and oil refineries, may be used to power the heating unit 254 for the desorption process in the second gas-liquid contactor 206. The regenerated alkaline capture solution may be stored and circulated back to the first gas-liquid contactor 202 for performing the first absorption reaction. In some instances, the regenerated alkaline capture solution includes a $CO_2$-lean alkaline capture solution with a baseline or a negligible level of dissolved $CO_2$ concentration. In some instances, the $CO_2$-lean alkaline capture solution or the regenerated alkaline capture solution has a pH value in a range of 11-14.

During the first time period, the interfacial surface structure in the first gas-liquid contactor 202 is wetted by the alkaline capture solution; the first flow from the first gaseous feed 212 is directed across the interfacial surface structure in the first gas-liquid contactor 202; and at least a portion of the $CO_2$ in the first gaseous feed 212 diffuses into the alkaline capture solution on the surfaces of the interfacial surface structure. The $CO_2$ concentration in the alkaline capture solution increases over time forming the first $CO_2$-rich alkaline capture solution. In some implementations, the $CO_2$ concentration in the first $CO_2$-rich alkaline capture solution becomes greater than the $CO_2$ concentration of the initial alkaline capture solution. The pH value of the first $CO_2$-rich alkaline capture solution in the first gas-liquid contactor 202 can be monitored in real-time or periodically, by operation of the monitoring unit 252. In response to the first $CO_2$-rich alkaline capture solution meeting one or more predetermined criteria (e.g., the $CO_2$ concentration of the first $CO_2$-rich alkaline capture solution being greater than a first $CO_2$ concentration threshold value (e.g., 1 mol %, 5 mol %, 10 mol %, 20 mol %, 50 mol %, 65 mol % or another value) or being within a first $CO_2$ concentration range (e.g., 1-65 mol %) which corresponds to the pH value of the first $CO_2$-rich alkaline capture solution being equal to or less than a first pH threshold value (<11) or being within a first pH range (e.g., 9-11) the first flow from the first gaseous feed 212 can be stopped.

Consecutively or simultaneously, the second flow from the second gaseous feed 214 can be activated. The second flow does not include gas from the ambient air. In other words, the second flow from the second gaseous feed 214 to the first gas-liquid contactor 202 is independent of the first gaseous feed 212. During the second time period, the second gaseous feed 214 is directed across the interfacial surface structure with the first $CO_2$-rich alkaline capture solution on its surfaces in the first gas-liquid contactor 202; and at least a portion of the $CO_2$ in the second gaseous feed 214 diffuses into the first $CO_2$-rich alkaline capture solution forming the second $CO_2$-rich alkaline capture solution. The $CO_2$ concentration of the second $CO_2$-rich alkaline capture solution increases over time; and becomes greater than the $CO_2$ concentration of the first $CO_2$-rich alkaline capture solution. The pH value of the second $CO_2$-rich alkaline capture solution in the first gas-liquid contactor 202 is monitored in real-time or periodically, by operation of the monitoring unit 252. In some implementations, the pH value of the second $CO_2$-rich alkaline capture solution in the first gas-liquid contactor 202 is in a range of 7-9.

In response to the second $CO_2$-rich alkaline capture solution meeting one or more predetermined criteria (e.g., the $CO_2$ concentration of the second $CO_2$-rich alkaline capture solution being greater than a second $CO_2$ concentration threshold value (e.g., 20 mol %, 30 mol %, 40 mol %, 50 mol %, 70 mol %, 80 mol %, 90 mol %, 100 mol %, or another value) or being within a second $CO_2$ concentration range 20-100 mol % which corresponds to the pH value of the second $CO_2$-rich alkaline capture solution being equal to or less than a second pH threshold value (e.g., <9) or being within a second pH range (e.g., 7-9)) the first liquid stream 226 can be activated; and the second $CO_2$-rich alkaline capture solution is transported from the first gas-liquid contactor 202 to the second gas-liquid contactor 206. In some instances, the first gaseous output stream 222 may include $CO_2$-stripped air during the first time period, and $N_2$ and $O_2$ during the second time period.

In some implementations, the second gaseous output stream 224 of the second gas-liquid contactor 206 includes $CO_2$ gas having a purity in a range of 91-100-wt % or another range. The $CO_2$ gas obtained during the desorption process may be compressed and used as a low global warming refrigerant, in green houses for enhanced productivity, welding, feedstock for urea and to other useful chemicals and/or liquid fuels, to provide low global warming heating or cooling, used as feedstock for urea other useful chemicals, fuels, concrete/cement, as a blowing agent, carbonated beverages, in greenhouses for nursery and vegetation, or sequestered underground in geological formations or offshore or onshore depleted oil fields where the $CO_2$ gas can be stored (e.g., sequestration), or in other applications.

In some instances, the example carbon dioxide removal system 200 may include various fluid handling components, including spray head, nozzles, valves, pumps, pipes, air movers, etc. for controlling the flow of liquids and gases. In some instances, the control system 256 is configured to communicate with the monitoring unit 252 and the various fluid handling components (e.g., the pump 108), the heating element 254 of the second gas-liquid contactor 206 for controlling the desorption reaction in the second gas-liquid contactor 206. In some implementations, the control system 256 may include computation apparatus, a memory unit, an input/output interface, or other components that allow the communication of the control system with other components of the example carbon dioxide removal system 200, determine control parameter values of the components of the example carbon dioxide removal system 200, and optimize the carbon dioxide removing performance of the example carbon dioxide removal system 200. In some instances, the control system may be configured for performing other functions.

Figure 2B:
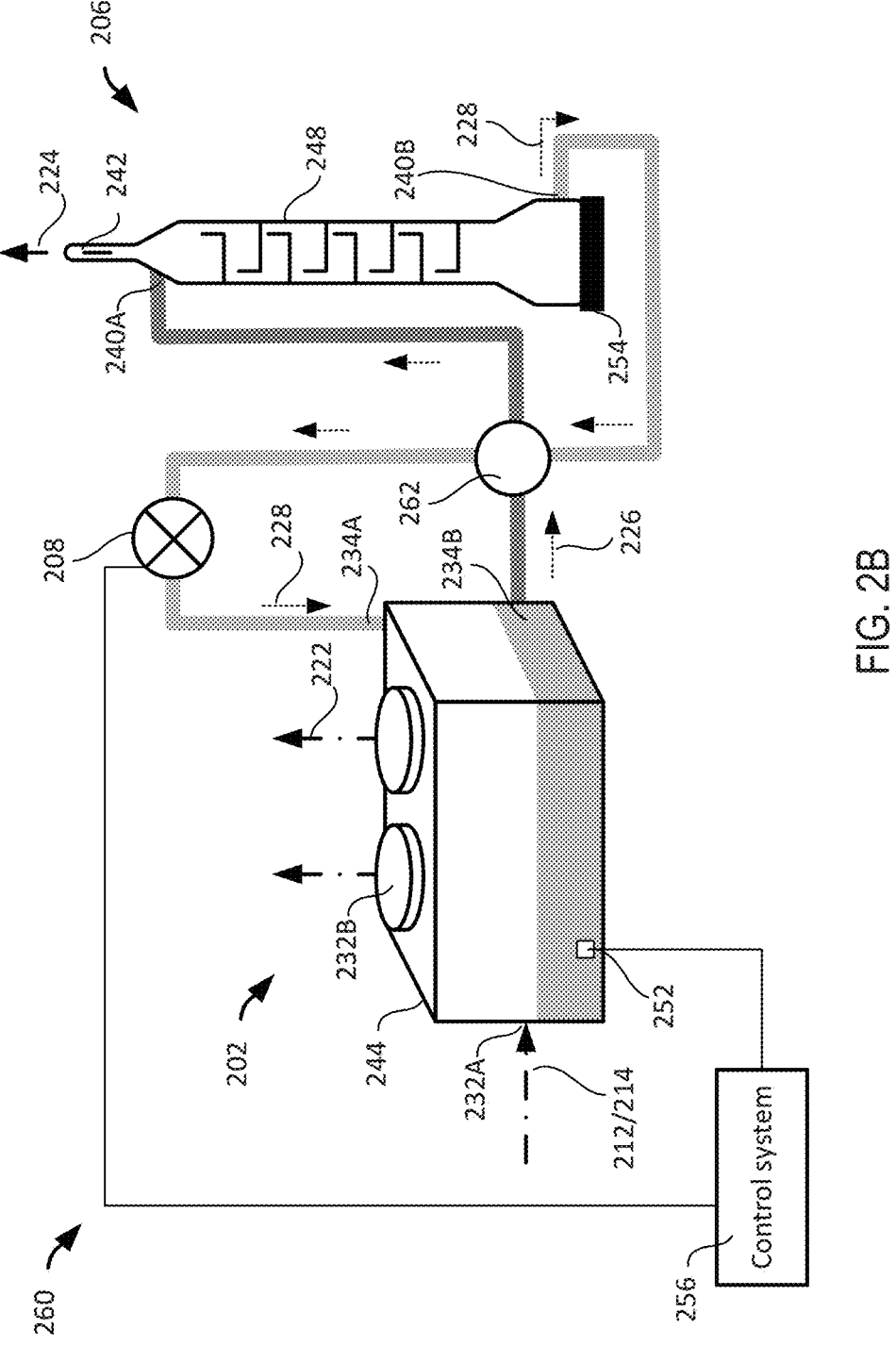
FIG. 2B is a schematic diagram showing aspects of an example hybrid carbon dioxide removal system.

FIG. 2B is a schematic diagram showing aspects of an example hybrid carbon dioxide removal system 260. In some implementations, the hybrid carbon dioxide removal system 260 is configured to perform a carbon dioxide ($CO_2$) capture and removal process by absorbing $CO_2$ gas from ambient air and flue gas sequentially using an alkaline capture solution. At least a portion of the $CO_2$ gas in a first gaseous feed containing ambient air and at least a portion of the $CO_2$ gas in a second gaseous feed of a flue gas can be removed from their respective feeds consecutively. The alkaline capture solution can be regenerated and recycled by removing at least a portion of the dissolved $CO_2$. In some instances, the example hybrid carbon dioxide system 260 can provide improved energy efficiency by reducing the total energy input needed for removing a unit weight of $CO_2$ from the gaseous feeds; and thus, can reduce the total cost of the $CO_2$ removal process.

As shown in FIG. 2B, components of the example hybrid carbon dioxide removal system 260 may be implemented as the respective components of the example hybrid carbon dioxide removal system 200 shown in FIG. 2A. The example hybrid carbon dioxide removal system 260 includes a heat exchanger 262. In some instances, during the desorption reaction in the second gas-liquid contactor 206, the second $CO_2$-rich alkaline capture solution is heated by the heating element 254, the $CO_2$-lean alkaline capture solution in the second gas-liquid contactor 206 from the second liquid outlet 240B may have a temperature in a range of 0-120 degree Celsius. The heat exchanger 262 is configured to recycle at least a portion of the heat from the $CO_2$-lean alkaline capture solution from the second gas-liquid contactor 206; and transfer heat from the recirculation stream 228 to the first liquid stream 226. In particular, the heat exchanger 262 is configured to transfer heat from the $CO_2$-lean alkaline capture solution in the recirculation stream 228 from the second gas-liquid contactor 206 to the second $CO_2$-rich alkaline capture solution in the first liquid stream 226 from the first gas-liquid contactor 202. In some instances, the heat exchanger 262 may have a shell-tube structure, a stacked-plate structure, or another structure.

Figure 3:
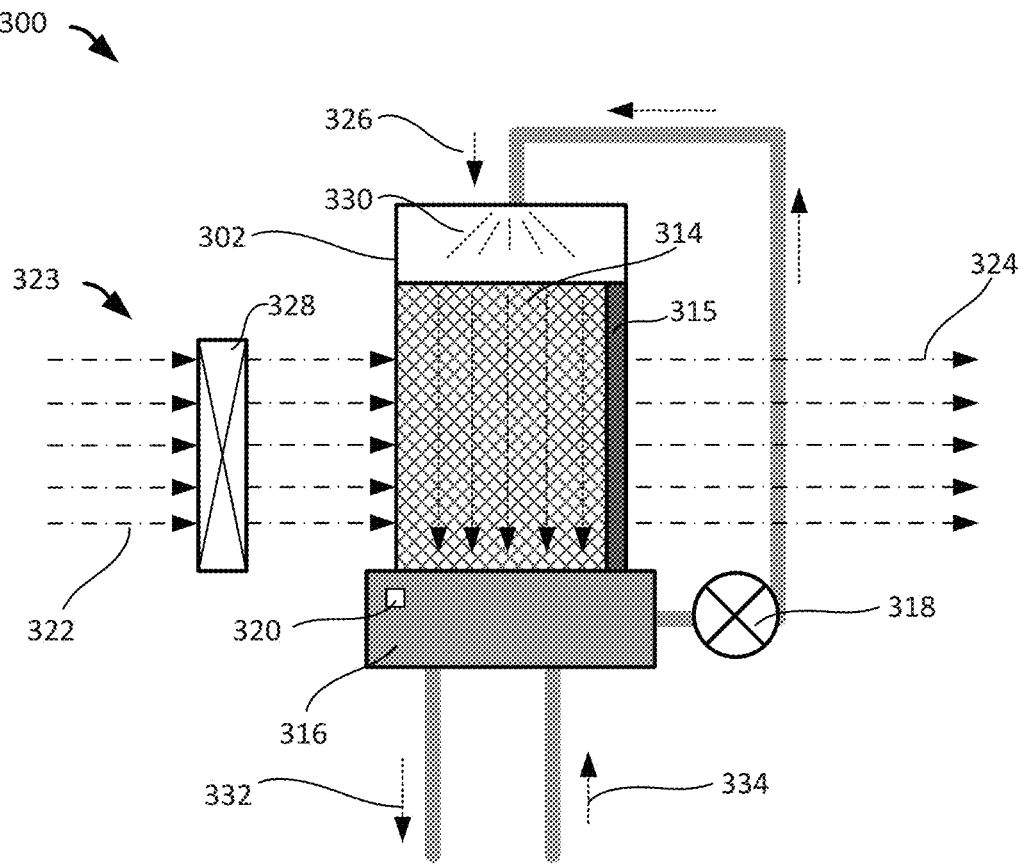
FIG. 3 is a schematic diagram showing aspects of an example gas-liquid contactor of the example hybrid carbon dioxide removal systems in FIGS. 1A-1C and 2A-2B.

FIG. 3 is a block diagram showing aspects of an example gas-liquid contactor 300. The gas-liquid contactor 300 may be deployed as any of the first gas-liquid contactors 102, 202 in the example hybrid carbon dioxide removal systems 100, 160, 170, 200, 260 in FIGS. 1A-1C and 2A-2B or in another type of system. The example gas-liquid contactor 300 may include additional or different features, and the components of the example gas-liquid contactor 300 may operate as described with respect to FIG. 3 or in another manner.

As shown in FIG. 3, the gas-liquid contactor 300 includes a reactor vessel 302 which includes an interfacial surface structure 314. The interfacial surface structure 314 may be configured to provide a high specific surface area, a high specific liquid mass retention of the liquid phase (e.g., the alkaline capture solution) on the surfaces of the interfacial surface structure 314, a uniform distribution of phases (e.g., the alkaline capture solution and gaseous feed), an efficient mass transfer, a low pressure loss, efficient carbon dioxide stripping, or any combination of some or all of these properties. In some cases, the interfacial surface structure 314 includes a reticulated structure defined by a cascade of contactor sheets. In some instances, contactor sheets may be packed with one another and separated by respective gaps. The contactor sheets can be assembled and arranged in the reactor vessel 302 of the gas-liquid contactor 300 according to the gas flow and the liquid flow. For example, the extension direction of the contactor sheets may be in parallel with both directions of the gas flow and the liquid flow. In some implementations, the contactor sheets are easy to assemble to facilitate a homogenous gas and liquid distribution that avoids premature local flooding and pressure loss.

In some implementations, each contactor sheet includes a surface structure having elevated portions and recesses. In some implementations, the height of the elevated portions and recesses is larger than the thickness of the contactor sheet. In some instances, sizes and shapes of the surface structures of the contactor sheets and spacings between neighboring contactor sheets are designed to reduce pressure drop, to improve turbulence and mixing, to increase randomness of wetting, and to provide other advantages. The surface structure can be periodic, with a repeating pattern or shape. The elevated portions and recesses of the contactor sheets when assembled can form channels where the liquid and gas phases can flow and contact each other. Shapes and dimensions of the channels may be defined, at least in part, by the surface structures and the spacings between neighboring contactor sheets. For example, the elevated portions or recesses may have a shape of pyramids, truncated pyramids, cones, truncated cones, partial spheres, or other profiles. In some instances, each contactor sheet of the reticulated structure of the interfacial surface structure 314 has an egg crate profile, a jagged wedge profile, interlocking fins, a staggered hemi-ovoid profile, a pyramid profile, or another type of profile. In some instances, the interfacial surface structure 314 may include a combination of contact sheets having profiles distinct from one another. In some instances, the interfacial surface structure 314 may include glass fibers and stainless steel meshes.

In some instances, each contactor sheet of the reticulated structure of the interfacial surface structure 314 in the gas-liquid contactor 300 can be manufactured individually. For example, each contactor sheet can be produced using a compression molding process, an injection molding process, a screen-printing process, a hot melt process, a vacuum molding process, a lamination process, additive manufacturing, sheet metal bending, an extrusion process, or other types of processes. In some instances, each contactor sheet of the interfacial surface structure 314 includes a thermoplastic material. For example, each contactor sheet of the interfacial surface structure 314 includes one or more of the following Polyethylene Polyvinyl Chloride (PVC), Polypropylene, Polyethylene terephthalate (PET), Polystyrene, Acrylonitrile butadiene styrene (ABS), or other types of thermoplastic material. In some instances, each contactor sheet of the interfacial surface structure 314 includes epoxide polymer, acrylic polymer, or another polymer. In some instances, the reticulated structure of the interfacial surface structure 314 can be produced using a 3D printing process, an electrospinning process, a cold-spray process, or another type of manufacturing process.

In some implementations, surfaces of the interfacial surface structure 314 may be modified or treated to increase surface area, increase hydrophilicity, improve chemical resistance, etc. In some instances, the interfacial surface structure 314 may be coated with one or more of a corrosive resistance coating, a hydrophilic coating, an antifouling coating, or other types of surface coatings.

In some instances, the example interfacial surface structure 314 may be spatially divided into multiple sections and arranged in tandem (one after another) along the downward flow direction of the alkaline capture solution, e.g., the Z direction. The alkaline capture solution is received by the interfacial surface structure 314 from the liquid distributor 330. Each section includes a set of contactor sheets. The set of contactor sheets in a section of the interfacial surface structure may be distinct from the set of contactor sheets in a different section of the interfacial surface structure. For example, different sections may have contactor sheets with different specific surface areas; may have the same collector sheets but different spacings; may have the same contactor sheets but different surface treatment (e.g., different hydrophobicity); or may include contactor sheets arranged in another manner. In some instances, the contactor sheets in the same section may have profiles distinct from one another.

In some implementations, surfaces of the contact sheets are wetted by gravity-driven downward flow of the alkaline capture solution 326, and the gaseous feed 322 cross flows within the spacings or channels (e.g., defined between neighboring contactor sheets) of the interfacial surface structure 314. The ascending gas phase and the descending liquid phase, e.g., the gaseous feed 322 and the alkaline capture solution 326, are brought into contact in channels and on the surfaces of the interfacial surface structure 314. During this contact, the $CO_2$ gas in the gaseous feed 322 can transfer into the alkaline capture solution on the surfaces of the interfacial surface structure 314; and mass transfer between phases is facilitated by the interfacial surface structure 314. In some implementations, the alkaline capture solution 326 may be implemented as the alkaline capture solution described in the example hybrid carbon dioxide removal systems 100, 160, 170, 200, 260 in FIGS. 1A-1C and 2A-2B. In some implementations, the gaseous feed 322 may include a gaseous feed of ambient air (e.g., the first gaseous feed 112, 212 in FIGS. 1A-1C and 2A-2B), a gaseous feed of a flue gas (e.g., the second gaseous feed 214 in FIGS. 2A-2B).

As shown in FIG. 3, the alkaline capture solution 326 can be pumped by a pump 318 and distributed, for example, by operation of nozzles or other types of liquid distributors 330, residing above the interfacial surface structure 314 in the reactor vessel 302 of the gas-liquid contactor 300. The alkaline capture solution 326 descends along the surfaces of the interfacial surface structure 314 forming wetted surfaces. In some implementations, the liquid distributors 330 are configured to provide better distribution of the alkaline capture solution 326, and thus a better wetting of the surface of the interfacial surface structure 314 and allows a better utilization of the existing geometrical surface for the mass transfer. For example, by spraying the alkaline capture solution from above the interfacial surface structure 314 using nozzles, that evenly distributes the alkaline capture solution 326 to all the surfaces of the interfacial surface structure, which in turn can improve the contact area between the alkaline capture solution 326 flowing down along the surface of the interfacial surface structure 314 and the gaseous feed 322 flowing through the interfacial surface structure 314. In some instances, the alkaline capture solution 326 can be distributed by the liquid distributor 330 onto the interfacial surface structure 314 through a pulsing and intermittent spray or a continuous spray, by operation of the pump 318, the liquid distributor 330, and a control system (e.g., the control system 156, 256 in FIGS. 1A-1C and 2A-2B).

In the example shown, the $CO_2$ gas in the gaseous feed 322 dissolves into the alkaline capture solution 326 and forms a first $CO_2$-rich alkaline capture solution. The $CO_2$ concentration of the first $CO_2$-rich alkaline capture solution is continuously measured and quantitively monitored, using a monitoring device 320 (e.g., a $CO_2$ concentration sensor and a temperature sensor) or another technique (e.g., sampling the solution and performing a gas chromatography). In response to the first $CO_2$ concentration being less than a first threshold value, the first $CO_2$-rich alkaline capture solution is collected from the interfacial surface structure 314 in the reservoir 316 and further continuously circulated by the pump 318 back to the interfacial surface structure 314. In response to the first $CO_2$ concentration being greater than or equal to the first threshold value, the circulation of the first $CO_2$-rich alkaline capture solution over the interfacial surface structure 314 is stopped; and the first $CO_2$-rich alkaline capture solution 326 is transported to an absorption/bubble column (e.g., the second gas-liquid contactor 104 in FIGS. 1A-1C). When the gas-liquid contactor 300 is configured to absorb $CO_2$ from the second gaseous feed, the $CO_2$ in the second gaseous feed dissolves into the first $CO_2$-rich alkaline capture solution and forms a second $CO_2$-rich alkaline capture solution. The second $CO_2$ concentration of the second $CO_2$-rich alkaline capture solution is continuously measured and quantitively monitored, using the monitoring device 320. In response to the second $CO_2$ concentration being less than a second threshold value, the second $CO_2$-rich alkaline capture solution is collected from the interfacial surface structure 314 in the reservoir 316 and further continuously circulated by the pump 318 back to the interfacial surface structure 314. In response to the second $CO_2$ concentration being greater than or equal to the second threshold value, the circulation of the second $CO_2$-rich alkaline capture solution over the interfacial surface structure 314 is stopped; and the second $CO_2$-rich alkaline capture solution 326 is transported to a desorption/stripping column (e.g., the second gas-liquid contactor 206 in FIGS. 2A-2B).

In some implementations, the monitoring device 320 may be configured to perform other types of sensing in the reservoir 316, including liquid level sensing, density sensing, pH sensing, liquid or gas flow sensing, temperature sensing, purity sensing, and weight sensing. In some instances, the monitoring device 320 may include measurement or analytical instrumentation such as in-situ Raman or infrared (IR) spectroscopy for yield sensing, gas chromatography, mass spectrometry, an autotitrator, or other types of monitoring devices. In some implementations, the monitoring device 320 may be implemented as the monitoring device 152A, 152B, 252 in FIGS. 1A-1C and 2A-2B.

In some implementations, the air mover 328 is configured to move the gaseous feed 322 over the interfacial surface structure 314 and produce gaseous exhaust 324. In particular, the example air mover 328 in FIG. 3 moves the gaseous feed 322 across the wetted surfaces of the interfacial surface structure 314, where the $CO_2$ gas from the ambient air is captured and dissolved in the alkaline capture solution 326 and the $CO_2$ gas from the flue gas is captured and dissolved in the first $CO_2$-rich alkaline capture solution. In some implementations, the $CO_2$ concentration in the gaseous exhaust 324 is less than that in the gaseous feed 322. In some instances, the gaseous exhaust 324 can be released from the gas-liquid contactor 300. In some implementations, mist in the gaseous exhaust can be aggregated into liquid droplets in a demister separator 315, which can be returned back the reservoir 316. In some instances, the demister separator 315 may be configured in another manner relative to the interfacial surface structure 314 according to the configuration of the air mover 328. In certain instances, the gaseous exhaust 324 is carbon dioxide stripped air or flue gas according to the implementations of the gas-liquid contactor 300 in the hybrid carbon dioxide removal systems 100, 160, 170, 200, 260 in FIGS. 1A-1C and 2A-2B. In some instances, the air mover 328 includes at least one of a compressor, a blower, a fan, a turbofan, a pump, a diaphragm pump, or a heating, ventilation, or air conditioning (HVAC) system. In some instances, the air mover 328 may be configured as a horizontal air mover, a vertical air mover or a combination or in another manner.

In some implementations, the gas-liquid contactor 300 based on the interfacial surface structure 314 can provide a carbon capture efficiency of 5-99% in a temperature range of −30° C. to 100° C. over a period of time. Here, the capture efficiency describes the proportion of $CO_2$ molecules captured in the absorption unit, compared to the total flux of $CO_2$ molecules through the system within a given time period (e.g., mass of $CO_2$ captured in one hour divided by mass of $CO_2$ through system in one hour). In some implementations, the absorption reaction in the gas-liquid contactor 300 and the desorption reaction in the stripping column are reversible reactions. In some implementations, the methods and techniques presented here in the disclosure are highly scalable and consumes less processing volume of alkaline capture solution and less energy is required in comparison with conventional carbon dioxide removal techniques.

FIG. 4 is a flow chart showing aspects of an example process 400 for removing $CO_2$ gas from ambient air and flue gas. The example process 400 can be used, for example, to operate a hybrid carbon dioxide removal system, e.g., the example carbon processing system 100, 160, 170, 200, 260 in FIGS. 1A-1C and 2A-2B. For instance, the example process 400 can be used to perform carbon dioxide removal directly from ambient air using a gas-liquid contactor filled with a high surface area interfacial surface structure; and sequentially perform carbon dioxide removal from a flue gas generated from industrial point sources. The example process 400 may include additional or different operations, including operations performed by additional or different components, and the operations may be performed in the order shown or in another order. In some implementations, one or more operations in the example process 400 can be performed by a computer system, for instance, by a digital computer system having one or more digital processors (e.g., data processing apparatus of the control system 156, 256 in FIGS. 1A-1C and 2A-2B) that execute instructions (e.g., instructions stored in the memory unit of the control system 156, 256 in FIGS. 1A-1C and 2A-2B).

At 402, surfaces of the interfacial surface structure in the gas-liquid contactor are wetted using an alkaline capture solution. The gas-liquid contactor can be, for example, the gas-liquid contactors 102, 202, 300 in FIGS. 1A-1C, 2A-2B and 3 or another type of gas-liquid contactor. The alkaline capture solution (e.g., the alkaline capture solution 326 in FIG. 3) can be pumped by a pump (e.g., the pump 318 in FIG. 3) and distributed by one or more liquid distributor (e.g., the liquid distributor 330 in FIG. 3) residing above the interfacial surface structure 314 in the gas-liquid contactor 300. The alkaline capture solution descends along the surfaces of the interfacial surface structure forming wet surfaces, e.g., driven by gravity. In some implementations, the alkaline capture solution includes an aqueous ionic base $(M^+Y^-)$, a phase transfer catalyst, an amine or a mixture of amines, and a carboxylic acid salt of an amino acid.

At 404, the first gaseous feed containing $CO_2$ gas is received from a first source. The first gaseous feed includes $CO_2$ gas. In some examples, the first gaseous feed is drawn from ambient air, and a concentration of the $CO_2$ gas in the first gaseous feed is equal to or less than 1000 parts per million (ppm). The first gaseous feed may have other properties in some cases.

At 406, a first flow of the first gaseous feed is directed to interact with the alkaline capture solution in the gas-liquid contactor. In some examples, the first flow of the first gaseous feed is directed across the surfaces of the interfacial surface structure in the gas-liquid contactor. The first gaseous feed flows across the surfaces of the interfacial surface structure in a crossflow fashion, in a counter flow fashion, or a hybrid flow fashion (e.g., crossflow and counter flow) during which the $CO_2$ gas in the first gaseous feed can be dissolved into the alkaline capture solution at the surfaces of the interfacial surface structure in the gas-liquid contactor and a first $CO_2$-rich alkaline capture solution can be formed.

In some implementations, the first $CO_2$-rich alkaline capture solution has a concentration of $CO_2$ greater than that of the initial ($CO_2$-lean) alkaline capture solution. The concentration of the dissolved $CO_2$ in the first $CO_2$-rich alkaline capture solution can be monitored. When the gas-liquid contactor is implemented as the first gas-liquid contactor 102 in FIGS. 1A-1C, in response to the concentration of the dissolved $CO_2$ in the first $CO_2$-rich alkaline capture solution being less than a first $CO_2$ concentration threshold value, the first $CO_2$-rich alkaline capture solution can be circulated internally in the gas-liquid contactor and continuously used for absorbing $CO_2$ gas in the first gaseous feed.

In response to the concentration of the dissolved $CO_2$ in the first $CO_2$-rich alkaline capture solution being equal to or greater than the first $CO_2$ concentration threshold value, the first $CO_2$-rich alkaline capture solution can be transferred to an absorption or bubble column (e.g., the second gas-liquid contactor 104 in FIGS. 1A-1C).

When the gas-liquid contactor is implemented as the first gas-liquid contactor 202 in FIGS. 2A-2B, in response to the concentration of the dissolved $CO_2$ in the first $CO_2$-rich alkaline capture solution being equal to or greater than the first $CO_2$ concentration threshold value, the gas-liquid contactor can switch between intake feeds (e.g., the gas-liquid contactor can switch from processing only the first gaseous feed to processing only a second gaseous feed from another source). In some examples, the first gaseous feed can be stopped, and the first $CO_2$-rich alkaline capture solution can be used to wet the interfacial surface structures in the gas-liquid contactor for absorbing $CO_2$ gas from the second gaseous feed containing a flue gas.

At 408, the second gaseous feed is received from a second source. The second gaseous feed includes $CO_2$ gas. The second gaseous feed has a $CO_2$ concentration in a range of above 1%, in a range of 1000 ppm to 40-wt %, or another range. In some instances, the second gaseous feed may be from a natural gas and ethanol refinery process, an iron and steel plant; a coal power plant, or another plant or process. In certain instances, the flue gas from the various industrial point sources may have a temperature in a range of 1-800 degrees Celsius.

At 410, a second flow from the second gaseous feed is directed to interact with the first $CO_2$-rich alkaline capture solution. In some implementations, the second flow from the second gaseous feed is directed to the same gas-liquid contactor (e.g., the first gas-liquid contactor 202 in FIGS. 2A-2B) that was previously used to absorb the $CO_2$ from the first gaseous feed. In this case, the first $CO_2$-rich alkaline capture solution is used to wet the surface of the interfacial surface structures of the gas-liquid contactor; the second flow from the second gaseous feed is directed to interact with the first $CO_2$-rich alkaline capture solution at the surfaces of the interfacial surface structure. A second $CO_2$-rich alkaline capture solution is formed in the gas-liquid contactor 202. The concentration of the dissolved $CO_2$ in the second $CO_2$-rich alkaline capture solution is greater than that of the dissolved $CO_2$ in the first $CO_2$-rich alkaline capture solution.

In some implementations, the second flow from the second gaseous feed is directed into a distinct gas-liquid contactor (e.g., the second gas-liquid contactor 104 in FIGS. 1A-1C). In some instances, the distinct gas-liquid contactor may be implemented as an absorption column (e.g., an autoclave), a bubbling column, a gas-liquid contactor with an interfacial surface structure, or another type of gas-liquid contactor. In this case, the first $CO_2$-rich alkaline capture solution is transferred from the first gas-liquid contactor 102 to the second gas-liquid contactor 104; and the second flow from the second gaseous feed is directed to interact with the first $CO_2$-rich alkaline capture solution in the second gas-liquid contactor 104. Similarly, the second $CO_2$-rich alkaline capture solution is formed by dissolving the $CO_2$ gas from the second gaseous feed into the first $CO_2$-rich alkaline capture solution.

At 412, the dissolved $CO_2$ gas is separated from the second $CO_2$-rich alkaline capture solution and the alkaline capture solution can be regenerated. In response to the $CO_2$ concentration in the $CO_2$-rich alkaline capture solution reaching a second $CO_2$ concentration threshold (e.g., when the first $CO_2$-rich alkaline capture solution is saturated with the dissolved $CO_2$ gas), the second $CO_2$-rich alkaline capture solution is filtered and transferred via pipes into a desorption column (e.g., the third gas-liquid contactor 106 in FIGS. 1A-1C or the second gas-liquid contactor 206 in FIGS. 2A-2B). The second $CO_2$-rich alkaline capture solution is then heated to a temperature sufficient to desorb at least a portion of the dissolved $CO_2$ gas and the liquid condensates. In some instances, the desorption column may include multiple trays or may operate as a packed bed to provide an easy vapor-liquid equilibrium and hence separation of the dissolved $CO_2$ gas from vapor/liquid condensate. After passing through the desorption column and a drying column for removing moisture, a $CO_2$ gas with a purity of 91-100% is collected. This $CO_2$ gas can then be compressed for sequestration or utilization in other applications. At the same time, the alkaline capture solution can be regenerated, e.g., forming a $CO_2$-lean alkaline capture solution with a baseline or a negligible level of dissolved $CO_2$ concentration. The $CO_2$-lean alkaline capture solution is recirculated back to the gas-liquid contactor 102, 202 which can be reused for further $CO_2$ removal process.

In some implementations, prior to passing the second $CO_2$-rich alkaline capture solution to the desorption column, the second $CO_2$-rich alkaline capture solution and a $CO_2$-lean alkaline capture solution are passed through a heat exchanger (e.g., the first heat exchanger 162, 262 in FIGS. 1A-1C and 2A-2B), wherein the heat exchanger is configured to transfer heat from the $CO_2$-lean alkaline capture solution to the second $CO_2$-rich alkaline capture solution. In some implementations, prior to passing the second $CO_2$-rich alkaline capture solution to the desorption column, the second $CO_2$-rich alkaline capture solution and the second gaseous feed are passed through a heat exchanger (e.g., the second heat exchanger 172 in FIG. 1C), wherein the heat exchanger is configured to transfer heat from the second gaseous feed to the second $CO_2$-rich alkaline capture solution.

FIGS. 5A-5B include a table 500 showing experiment conditions and associated total energy input using different hybrid carbon dioxide removal systems shown in FIGS. 1A-1C and 2A-2C. The example data shown represent tests conducted with five different alkaline capture solutions. The capture solution 1 included an aqueous ionic base ($M^+Y^-$), a phase transfer catalyst, an amine or a mixture of amines, and a or a mixture of carboxylic acid salt of an amino acid. The capture solution 2 included Glycine, Proline, Cysteine, Sarcosine, Arginine and Guanidine, primary, secondary and tertiary amino acids, The capture solution 3 included potassium hydroxide, sodium hydroxide, calcium hydroxide, lithium hydroxide, barium hydroxide, vanadium hydroxide, titanium hydroxide, Cerium hydroxide, potassium carbonate, sodium carbonate, vanadium carbonate, lithium carbonate, calcium carbonate, barium carbonate, titanium carbonate, quaternary ammonium carbonates or hydroxides, ammonium hydroxide and/or carbonates. The capture solution 4 included tetramethyl ammonium hydroxide or carbonate, tetrabutylammonium hydroxide or carbonate, trimethyl ethyl ammonium hydroxide or carbonate, trimethyl butyl ammonium hydroxide or carbonate, triethyl methyl ammonium hydroxide or carbonate, tributyl methyl ammonium hydroxide or carbonate, tributyl methyl ammonium hydroxide or carbonate, methyl ethyl butyl ammonium hydroxide or carbonate, dimethyl ethyl butyl ammonium hydroxide or carbonate, methyl ethyl butyl ammonium hydroxide or carbonate, tetramethylammonium fluoride or iodide, tetraethyl ammonium fluoride or iodide, tetrabutylammonium fluoride or iodide, The capture solution 5 included monoethanolamine (MEA), diethanolamine (DEA) and methyldiethanolamine (MDEA), Piperazine, any primary, secondary and tertiary amines.

The desorption temperatures for the experiments were kept in a range of 109-123 degree Celsius. The percentage of $CO_2$ separated from the second $CO_2$-rich alkaline capture solution was in a range of 89-99%. The purity of the concentrated $CO_2$ from the desorption column was in a range of 92-99%.

Figure 6:
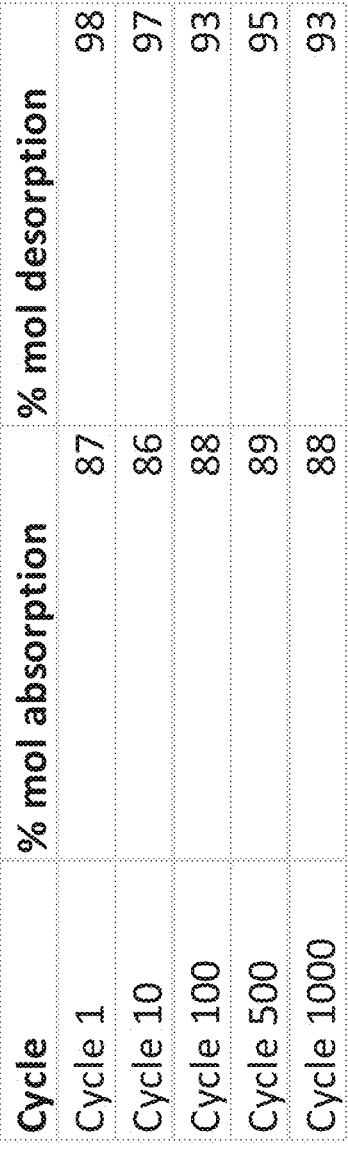
FIG. 6 is a table showing a recyclability test of the alkaline capture solution using the example hybrid carbon dioxide removal system shown in FIG. 1A.

The total energy input per ton $CO_2$ captured (MWh/ton $CO_2$) with and without the flue gas were compared. As shown in FIG. 6, the methods and systems presented here can reduce the total energy input by absorbing the $CO_2$ gas from the ambient air and the flue gas sequentially. The total energy input per ton $CO_2$ captured (MWh/ton $CO_2$) with and without the use of the heater exchanger 162, 262 are also compared. As shown in FIG. 6, the methods and systems presented here using recycled heat energy in the desorption reaction can further reduce the total energy input.

FIG. 6 is a table 600 showing recyclability test of the alkaline capture solution using the example hybrid carbon dioxide removal system 100. The first gaseous feed includes 4% of $CO_2$, 12% of $O_2$+84% of $N_2$ at a pressure of 20 psig in the first gas-liquid contactor 102. The second gas-liquid contactor 104 includes an autoclave and the pressure during operation of the autoclave is 2 bar at a temperature of 16 degree Celsius. The desorption temperature in the third gas-liquid contactor 106 is set as 116 degrees Celsius. As shown in FIG. 6, the mole percentage of the total $CO_2$ dissolved in the first and second gas-liquid contactor 102, 104 during 1000 cycles of operation is in a range of 86-89%; and the mole percentage of the $CO_2$ separated from the second $CO_2$-rich alkaline capture solution during 1000 cycles of operation is in a range of 93-98%.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media.

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

In a general aspect, a carbon processing system for carbon dioxide removal from a gaseous feed is presented.

In a first example, a method to remove carbon dioxide ($CO_2$) gas from a first gaseous feed and a second gaseous feed includes wetting a gas-liquid contactor with an alkaline capture solution; receiving the first gaseous feed from a first source, the first gaseous feed comprising $CO_2$; and directing a first flow from the first gaseous feed to interact with the alkaline capture solution in the gas-liquid contactor. A first portion of $CO_2$ from the first gaseous feed is dissolved into the alkaline capture solution forming a first $CO_2$-rich alkaline capture solution. The method further includes receiving the second gaseous feed including $CO_2$ from a second, distinct source; and directing a second flow from the second gaseous feed to interact with the first $CO_2$-rich alkaline capture solution. The second flow is independent of the first gaseous feed. A second portion of $CO_2$ from the second gaseous feed is dissolved into the first $CO_2$-rich alkaline capture solution forming a second $CO_2$-rich alkaline capture solution. A concentration of $CO_2$ in the second $CO_2$-rich alkaline capture solution is higher than a concentration of $CO_2$ in the first $CO_2$-rich alkaline capture solution. The method includes separating a third portion of $CO_2$ from the second $CO_2$-rich alkaline capture solution.

Implementations of the first example may include one or more of the following features. The alkaline capture solution includes an aqueous ionic base ($M^+Y^-$), a phase transfer catalyst, an amine or a mixture of amines, and a carboxylic acid salt of an amino acid. The first gaseous feed includes ambient air, and a concentration of the $CO_2$ gas in the first gaseous feed is equal to or less than 1000 parts per million (ppm). The second gaseous feed includes a flue gas, and a concentration of the $CO_2$ gas in the second gaseous feed is in a range of 1000 ppm to 40 weight percent.

Implementations of the first example may include one or more of the following features. When the third portion of $CO_2$ from the second $CO_2$-rich alkaline capture solution is separated, the second $CO_2$-rich alkaline capture solution is passed to a desorption column; and the second $CO_2$-rich alkaline capture solution in the desorption column is heated to a temperature to separate the third portion of $CO_2$. The temperature in the desorption column is below 200 degrees Celsius. Prior to passing the second $CO_2$-rich alkaline capture solution to the desorption column, the second $CO_2$-rich alkaline capture solution and a $CO_2$-lean alkaline capture solution are passed through a heat exchanger, which transfers heat from the $CO_2$-lean alkaline capture solution to the second $CO_2$-rich alkaline capture solution. Prior to passing the second $CO_2$-rich alkaline capture solution to the desorption column, the second $CO_2$-rich alkaline capture solution and the second gaseous feed are passed through a heat exchanger, which transfers heat from the second gaseous feed to the second $CO_2$-rich alkaline capture solution.

Implementations of the first example may include one or more of the following features. The gas-liquid contactor is wetted with the first $CO_2$-rich alkaline capture solution. The second flow is directed into the gas-liquid contactor to interact with the first $CO_2$-rich alkaline capture solution. The first $CO_2$-rich alkaline capture solution is transferred from the gas-liquid contactor to a bubbling column. The second flow from the second gaseous feed is directed to interact with the first $CO_2$-rich alkaline capture solution in the bubbling column. Prior to transferring the first $CO_2$-rich alkaline capture solution from the gas-liquid contactor to the bubbling column, the concentration of $CO_2$ of the first $CO_2$-rich alkaline capture solution is determined; and in response to the concentration of $CO_2$ of the first $CO_2$-rich alkaline capture solution being equal to or less than a predetermined threshold value, the first $CO_2$-rich alkaline capture solution is determined to be transferred from the gas-liquid contactor to the bubbling column.

In a second example, a hybrid carbon dioxide removal system for removing carbon dioxide ($CO_2$) gas from a first gaseous feed and a second gaseous feed includes a first gas-liquid contactor, a second gas-liquid contactor, and a third gas-liquid contactor. The first gas-liquid contactor includes a first inlet that receives an alkaline capture solution; and a first flow path that receives the first gaseous feed from a first source and directs a first flow of the first gaseous feed to interact with an alkaline capture solution in the first gas-liquid contactor. Directing the first flow causes a first portion of $CO_2$ from the first gaseous feed to dissolve into the alkaline capture solution and form a first $CO_2$-rich alkaline capture solution. The second gas-liquid contactor includes a second inlet that receives the first $CO_2$-rich alkaline capture solution from the first gas-liquid contactor; and a second flow path that receives the second gaseous feed from a second source and directs a second flow of the second gaseous feed to interact with the first $CO_2$-rich alkaline capture solution. Directing the second flow causes a second portion of $CO_2$ from the second gaseous feed to dissolve into the first $CO_2$-rich alkaline capture solution and form a second $CO_2$-rich alkaline capture solution. The second flow is independent of the first gaseous feed, and a concentration of $CO_2$ in the second $CO_2$-rich alkaline capture solution is higher than a concentration of $CO_2$ in the first $CO_2$-rich alkaline capture solution. The third gas-liquid contactor includes a third inlet that receives the second $CO_2$-rich alkaline capture solution from the second gas-liquid contactor; and a vessel that separates a third portion of $CO_2$ from the second $CO_2$-rich alkaline capture solution.

Implementations of the second example may include one or more of the following features. The alkaline capture solution includes an aqueous ionic base ($M^+Y^-$), a phase transfer catalyst, an amine or a mixture of amines, and a carboxylic acid salt of an amino acid. The first gaseous feed includes ambient air, and a concentration of the $CO_2$ gas in the first gaseous feed is equal to or less than 1000 parts per million (ppm). The second gaseous feed includes a flue gas, and a concentration of the $CO_2$ gas in the second gaseous feed is in a range of 1000 ppm to 40 weight percent.

Implementations of the second example may include one or more of the following features. The third gas-liquid contactor includes a heating element configured to heat the second $CO_2$-rich alkaline capture solution to a temperature sufficient to separate the third portion of $CO_2$. The third gas-liquid contactor includes a desorption column, and the heating element is configured to heat the second $CO_2$-rich alkaline capture solution to a temperature below 200 degrees Celsius. The third gas-liquid contactor is configured to generate a $CO_2$-lean alkaline capture solution when the third portion of $CO_2$ is separated from the second $CO_2$-rich alkaline capture solution, and the system further includes a heat exchanger configured to allow heat transfer from the $CO_2$-lean alkaline capture solution to the second $CO_2$-rich alkaline capture solution. The system further includes a heat exchanger configured to transfer heat from the second gaseous feed to the second $CO_2$-rich alkaline capture solution.

Implementations of the second example may include one or more of the following features. The first gas-liquid contactor further includes a sensor configured to measure the concentration of $CO_2$ of the first $CO_2$-rich alkaline capture solution, and the system further includes a control system communicably coupled to the sensor and configured to determine the concentration of $CO_2$ of the first $CO_2$-rich alkaline capture solution; compare the determined concentration of $CO_2$ of the first $CO_2$-rich alkaline capture solution with a predetermined threshold value; and in response to the concentration of $CO_2$ of the first $CO_2$-rich alkaline capture solution being equal to or less than the predetermined threshold value, determine to transfer the first $CO_2$-rich alkaline capture solution from the first gas-liquid contactor to the second gas-liquid contactor.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method to remove carbon dioxide ($CO_2$) gas from gaseous feeds, the method comprising:
  wetting a first gas-liquid contactor with an alkaline capture solution;
  receiving a first-gaseous feed from a first source, the first gaseous feed comprising $CO_2$;
  directing a first flow from the first gaseous feed to interact with the alkaline capture solution in the first gas-liquid contactor, wherein directing the first flow causes a first portion of $CO_2$ from the first gaseous feed to dissolve into the alkaline capture solution forming a first $CO_2$-rich alkaline capture solution;
  receiving a second gaseous feed from a second, distinct source, the second gaseous feed comprising $CO_2$;
  directing a second flow from the second gaseous feed to interact with the first $CO_2$-rich alkaline capture solution, wherein the second flow is independent of the first gaseous feed, and directing the second flow causes a second portion of $CO_2$ from the second gaseous feed to dissolve into the first $CO_2$-rich alkaline capture solution forming a second $CO_2$-rich alkaline capture solution, and a concentration of $CO_2$ in the second $CO_2$-rich alkaline capture solution is higher than a concentration of $CO_2$ in the first $CO_2$-rich alkaline capture solution;
  passing the second $CO_2$-rich alkaline capture solution to a second gas-liquid contactor;
  heating the second gas-liquid contactor using geothermal heat; and
  separating a third portion of $CO_2$ from the second $CO_2$-rich alkaline capture solution at the second gas-liquid contactor while heating the second gas-liquid contactor.

2. The method of claim 1, wherein the alkaline capture solution comprises:
  an aqueous ionic base ($M^+Y^-$),
  a phase transfer catalyst,
  an amine or a mixture of amines, and
  a carboxylic acid salt of an amino acid.

3. The method of claim 1, wherein the first gaseous feed comprises ambient air, and a concentration of the $CO_2$ gas in the first gaseous feed is equal to or less than 1000 parts per million (ppm).

4. The method of claim 1, wherein separating the third portion of $CO_2$ from the second $CO_2$-rich alkaline capture solution at the second gas-liquid contactor comprises:
  receiving the geothermal heat at a heating unit; and
  heating the second $CO_2$-rich alkaline capture solution in the second gas-liquid contactor to a temperature to separate the second portion of $CO_2$.

5. The method of claim 4, wherein heating the second $CO_2$-rich alkaline capture solution in the second gas-liquid contactor to a temperature to separate the third portion of $CO_2$ comprises heating the second $CO_2$-rich alkaline capture solution to a temperature below 200 degrees Celsius.

6. The method of claim 4, comprising:
  prior to passing the second $CO_2$-rich alkaline capture solution to the second gas-liquid contactor, passing the second $CO_2$-rich alkaline capture solution and a $CO_2$-lean alkaline capture solution through a heat exchanger, wherein the heat exchanger transfers heat from the $CO_2$-lean alkaline capture solution to the second $CO_2$-rich alkaline capture solution.

7. A carbon dioxide removal system for removing carbon dioxide ($CO_2$) gas from gaseous feeds, the system comprising:
  a first gas-liquid contactor comprising:
    a first inlet that receives an alkaline capture solution; and
    a first flow path that receives the first gaseous feed from a first source and directs a first flow of the first gaseous feed to interact with the alkaline capture solution in the first gas-liquid contactor, wherein directing the-first flow causes a first portion of $CO_2$ from the first gaseous feed to dissolve into the alkaline capture solution and form a first $CO_2$-rich alkaline capture solution;
  a second gas-liquid contactor comprising:
    a second inlet that receives the first CO2-rich alkaline capture solution from the first gas-liquid contactor; and
    a second flow path that receives the second gaseous feed from a second source and directs a second flow of the second gaseous feed to interact with the first $CO_2$-rich alkaline capture solution, wherein directing the second flow causes a second portion of $CO_2$ from the second gaseous feed to dissolve into the first $CO_2$-rich alkaline capture solution and form a second $CO_2$-rich alkaline capture solution, wherein the second flow is independent of the first gaseous feed, and a concentration of $CO_2$ in the second $CO_2$-rich alkaline capture solution is higher than a concentration of $CO_2$ in the first $CO_2$-rich alkaline capture solution; and
  a third gas-liquid contactor comprising:
    a third inlet that receives the second $CO_2$-rich alkaline capture solution from the second first gas-liquid contactor;
    a vessel that separates a third portion of $CO_2$ from the second $CO_2$-rich alkaline capture solution; and
    a heating unit configured to:
      receive geothermal heat; and
      heat the vessel, wherein heating the vessel causes the third second portion of $CO_2$ being separated from the second $CO_2$-rich alkaline capture solution.

8. The system of claim 7, wherein the alkaline capture solution comprises:
  an aqueous ionic base ($M^+Y^-$),
  a phase transfer catalyst,
  an amine or a mixture of amines, and
  a carboxylic acid salt of an amino acid.

9. The system of claim 7, wherein the first gaseous feed comprises ambient air, and a concentration of the $CO_2$ gas in the first gaseous feed is equal to or less than 1000 parts per million (ppm).

10. The system of claim 7, wherein the heating unit is configured to heat the second $CO_2$-rich alkaline capture solution in the vessel to a temperature sufficient to separate the third portion of $CO_2$.

11. The system of claim 10, wherein the third gas-liquid contactor comprises a desorption column, and the heating unit is configured to heat the second $CO_2$-rich alkaline capture solution to a temperature below 200 degrees Celsius using the geothermal heat.

12. The method of claim 1, wherein heating the second gas-liquid contactor using geothermal heat comprises:
  heating the second gas-liquid contactor using geothermal heat and by operation of a solar heating system.

13. The method of claim 1, comprising:

wetting the first gas-liquid contactor with the first $CO_2$-rich alkaline capture solution, wherein directing the second flow to interact with the first $CO_2$-rich alkaline capture solution comprises directing the second flow to interact with the first $CO_2$-rich alkaline capture solution in the first gas-liquid contactor.

14. The method of claim 1, wherein passing the first $CO_2$-rich alkaline capture solution to the second gas-liquid contactor comprising:

passing the first $CO_2$-rich alkaline capture solution from the first gas-liquid contactor to a third gas-liquid contactor, wherein directing the second flow from the second gaseous feed to interact with the first $CO_2$-rich alkaline capture solution comprises directing the second flow from the second gaseous feed to interact with the first $CO_2$-rich alkaline capture solution in the third gas-liquid contactor forming the second $CO_2$-rich alkaline capture solution; and passing the second $CO_2$-rich alkaline capture solution from the third gas-liquid contactor to the second gas-liquid contactor.

15. The method of claim 14, comprising:

prior to passing the second $CO_2$-rich alkaline capture solution to the second gas-liquid contactor, passing the second $CO_2$-rich alkaline capture solution and the second gaseous feed through a heat exchanger, wherein the heat exchanger transfers heat from the second gaseous feed to the second $CO_2$-rich alkaline capture solution.

16. The system of claim 7, wherein the heating unit further comprises a solar heating system, and heating the vessel comprises heating the vessel using the geothermal heat and by operation of the solar heating system.

17. The system of claim 7, wherein the third second gas-liquid contactor is configured to generate a $CO_2$-lean alkaline capture solution when the third portion of $CO_2$ is separated from the second $CO_2$-rich alkaline capture solution, and the system further comprises a heat exchanger configured to allow heat transfer from the $CO_2$-lean alkaline capture solution to the second $CO_2$-rich alkaline capture solution.

18. The system of claim 7, further comprising:

a heat exchanger configured to transfer heat from the second gaseous feed to the second $CO_2$-rich alkaline capture solution.

* * * * *